US012659865B2

(12) United States Patent
Chen et al.

(10) Patent No.: US 12,659,865 B2
(45) Date of Patent: Jun. 16, 2026

(54) OPPORTUNISTIC POSITION LOCATION DETERMINATION AND REPORTING FOR ASSET TRACKING AND MONITORING

(71) Applicant: QUALCOMM Incorporated, San Diego, CA (US)

(72) Inventors: An Chen, San Diego, CA (US); Alex Park, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 436 days.

(21) Appl. No.: 18/483,302

(22) Filed: Oct. 9, 2023

(65) Prior Publication Data

US 2025/0119834 A1 Apr. 10, 2025

(51) Int. Cl.
*H04W 52/02* (2009.01)

(52) U.S. Cl.
CPC .............................. *H04W 52/0235* (2013.01)

(58) Field of Classification Search
CPC ......... H04W 52/0235; H04W 52/0216; H04W 52/0229; H04W 52/0245; H04W 52/028; H04W 64/00; H04W 4/029; H04W 4/40
See application file for complete search history.

(56) References Cited

U.S. PATENT DOCUMENTS 10,739,152 B2 * 8/2020 Fryer ........................ G08G 1/20
11,606,756 B2 * 3/2023 Gurgul .................. G01S 19/396

2010/0112955 A1 * 5/2010 Krishnaswamy ..... G06F 1/3203
                                                        455/67.11
2011/0309977 A1 * 12/2011 Daugherty, Jr. ........ G01S 19/42
                                                        342/357.74
2019/0279212 A1   9/2019 Brown et al.
2022/0044091 A1 * 2/2022 Sundararajan ........ G01S 5/0278
2022/0334215 A1   10/2022 Thompson et al.

OTHER PUBLICATIONS

International Search Report and Written Opinion—PCT/US2024/048687—ISA/EPO—Jan. 2, 2025.

* cited by examiner

*Primary Examiner* — Robert C Scheibel
(74) *Attorney, Agent, or Firm* — Procopio, Cory, Hargreaves & Savitch LLP

(57) ABSTRACT

A method is disclosed herein. The method includes receiving, from a server, first data that is indicative of a first likelihood of the UE successfully performing at least one of a position fix or a transmission of sensor data based on a first set of characteristics associated with the UE and at least one additional UE. The method includes computing, based on the first data and a second set of characteristics associated with the UE, a second likelihood of the UE successfully performing at least one of the position fix or the transmission of the sensor data. The method includes scheduling, based on the second likelihood, a wake-up time instance or a sleep time instance. The method includes transitioning the UE (1) from a sleep state to an active state at the wake-up time instance or (2) from the active state to the sleep state at the sleep time instance.

30 Claims, 16 Drawing Sheets

Example 802 – Signal Prediction $\Phi$ = Azimuth angle of departure (A-AoD)
$\theta$ = Zenith angle of departure (Z-AoD)
$\rho$ = Distance
$\Phi'$ = Azimuth angle of arrival (A-AoA)
$\theta'$ = Zenith angle of arrival (Z-AoA)

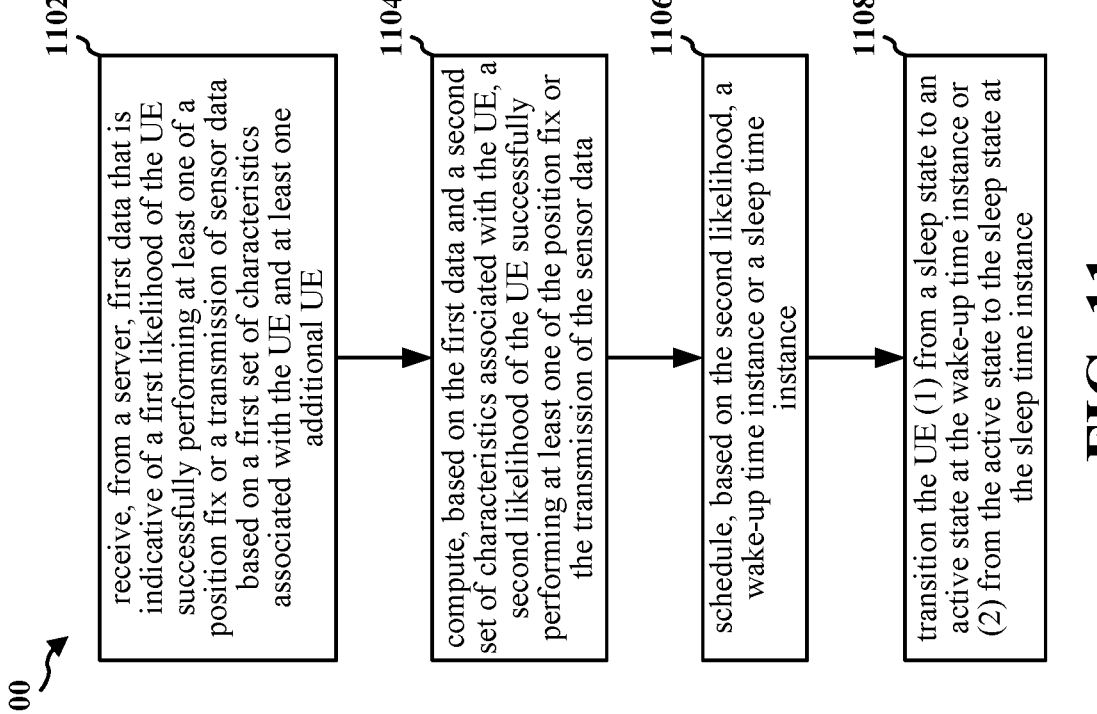

1100

1102 receive, from a server, first data that is indicative of a first likelihood of the UE successfully performing at least one of a position fix or a transmission of sensor data based on a first set of characteristics associated with the UE and at least one additional UE 1104 compute, based on the first data and a second set of characteristics associated with the UE, a second likelihood of the UE successfully performing at least one of the position fix or the transmission of the sensor data 1106 schedule, based on the second likelihood, a wake-up time instance or a sleep time instance 1108 transition the UE (1) from a sleep state to an active state at the wake-up time instance or (2) from the active state to the sleep state at the sleep time instance

FIG. 11

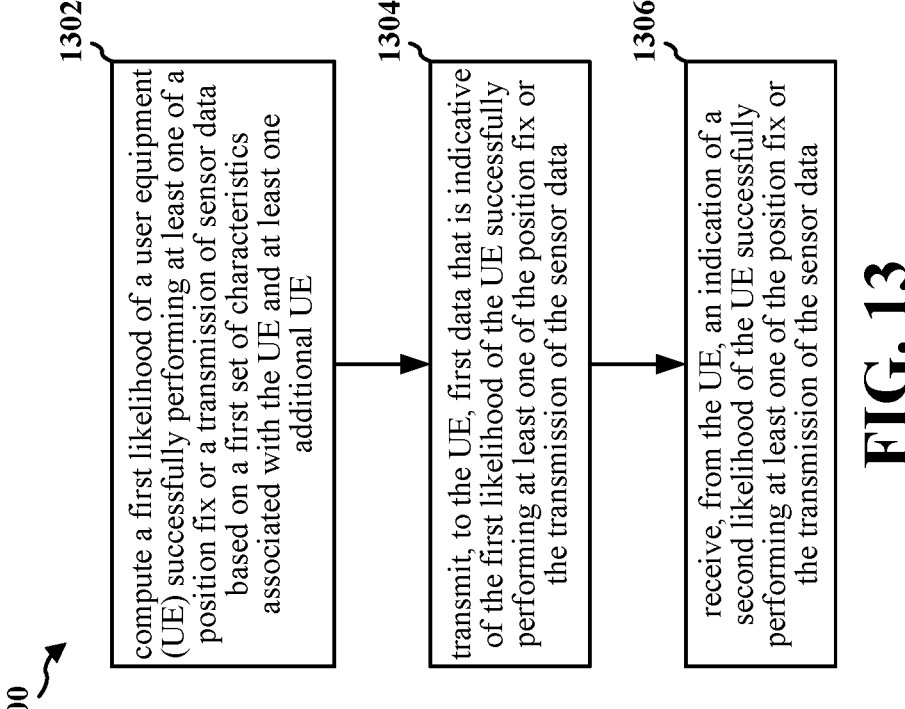

1300

1302 compute a first likelihood of a user equipment (UE) successfully performing at least one of a position fix or a transmission of sensor data based on a first set of characteristics associated with the UE and at least one additional UE

1304 transmit, to the UE, first data that is indicative of the first likelihood of the UE successfully performing at least one of the position fix or the transmission of the sensor data

1306 receive, from the UE, an indication of a second likelihood of the UE successfully performing at least one of the position fix or the transmission of the sensor data

1402 transmit, to the UE, an indication of a pre-scheduled wake-up time instance or a pre-scheduled sleep time instance, where the indication of at least one of the position fix or the transmission of the sensor data is associated with a time instance that is different from the pre-scheduled wake-up time instance or the pre-scheduled sleep time instance

1404 compute a first likelihood of a user equipment (UE) successfully performing at least one of a position fix or a transmission of sensor data based on a first set of characteristics associated with the UE and at least one additional UE

1406 transmit, to the UE, first data that is indicative of the first likelihood of the UE successfully performing at least one of the position fix or the transmission of the sensor data

1408 receive, from the UE, an indication of a second likelihood of the UE successfully performing at least one of the position fix or the transmission of the sensor data

1410 re-compute, based on the second likelihood, the first likelihood of the UE successfully performing at least one of the position fix or the transmission of the sensor data

1412 transmit, to the UE, second data that is indicative of the re-computed first likelihood of the UE successfully performing at least one of the position fix or the transmission of the sensor data

1414 receive, from the UE, an indication of at least one of the position fix or the transmission of the sensor data

OPPORTUNISTIC POSITION LOCATION DETERMINATION AND REPORTING FOR ASSET TRACKING AND MONITORING

TECHNICAL FIELD

The present disclosure relates generally to communication systems, and more particularly, to wireless communication.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects. This summary neither identifies key or critical elements of all aspects nor delineates the scope of any or all aspects. Its sole purpose is to present some concepts of one or more aspects in a simplified form as a prelude to the more detailed description that is presented later.

In an aspect of the disclosure, a method, a computer-readable medium, and an apparatus for wireless communication at a user equipment (UE) are provided. The apparatus includes at least one memory; and at least one processor coupled to the at least one memory and, based at least in part on information stored in the at least one memory, the at least one processor, individually or in any combination, is configured to receive, from a server, first data that is indicative of a first likelihood of the UE successfully performing at least one of a position fix or a transmission of sensor data based on a first set of characteristics associated with the UE and at least one additional UE; compute, based on the first data and a second set of characteristics associated with the UE, a second likelihood of the UE successfully performing at least one of the position fix or the transmission of the sensor data; schedule, based on the second likelihood, a wake-up time instance or a sleep time instance; and transition the UE (1) from a sleep state to an active state at the wake-up time instance or (2) from the active state to the sleep state at the sleep time instance.

In an aspect of the disclosure, a method, a computer-readable medium, and an apparatus for wireless communication at a server are provided. The apparatus includes at least one memory; and at least one processor coupled to the at least one memory and, based at least in part on information stored in the at least one memory, the at least one processor, individually or in any combination, is configured to compute a first likelihood of a user equipment (UE) successfully performing at least one of a position fix or a transmission of sensor data based on a first set of characteristics associated with the UE and at least one additional UE; transmit, to the UE, first data that is indicative of the first likelihood of the UE successfully performing at least one of the position fix or the transmission of the sensor data; and receive, from the UE, an indication of a second likelihood of the UE successfully performing at least one of the position fix or the transmission of the sensor data.

To the accomplishment of the foregoing and related ends, the one or more aspects may include the features hereinafter fully described and particularly pointed out in the claims. The following description and the drawings set forth in detail certain illustrative features of the one or more aspects. These features are indicative, however, of but a few of the various ways in which the principles of various aspects may be employed.

BRIEF DESCRIPTION OF THE DRAWINGS

FIG. 11 is a flowchart of a method of wireless communication.

FIG. 13 is a flowchart of a method of wireless communication.

FIG. 14 is a flowchart of a method of wireless communication.

DETAILED DESCRIPTION

Figure 1:
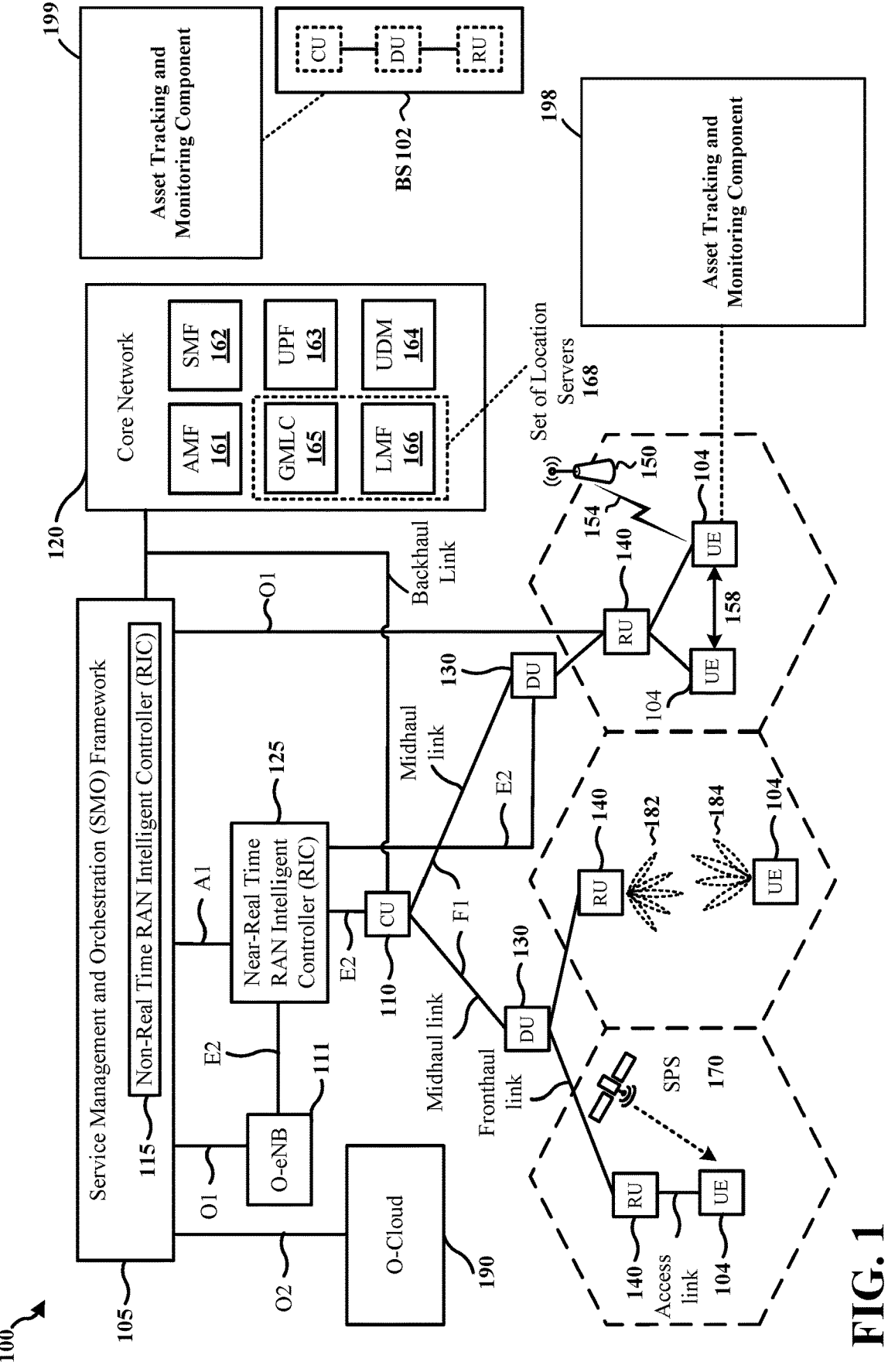
FIG. 1 is a diagram illustrating an example of a wireless communications system and an access network.

An Internet of Things (IoT) device may refer to a device that includes sensors, processor(s), software, and other technologies that connect and exchange data with other devices (e.g., other IoT devices, a server, etc.) and systems over a network (e.g., the Internet). IoT devices may be part of a fleet of IoT devices (i.e., a plurality of IoT devices) managed by a fleet management system (FMS) backend (e.g., a server, a cloud server, etc.). In an example, the fleet of IoT devices may be included in/implemented on vehicles that travel over a geographic area. The IoT devices may be configured to wake up at predefined intervals in order to perform a position fix (e.g., determine a location of an IoT device by way of a global navigation satellite system (GNSS)) and/or to collect sensor data (e.g., perform temperature measurements, capture images, etc.). The IoT devices may then transmit an indication of the position fix and/or the sensor data to the FMS backend, where the FMS backend may utilize the position fix and/or the sensor data to manage the IoT devices and/or to perform other functionality.

In some scenarios, an IoT device may be (1) unable to perform the position fix, (2) unable to collect the sensor data, and/or (3) unable to transmit the indication of the position fix or the sensor data. For instance, conditions in an environment of the IoT device may prevent the IoT device from being able to perform the position fix, sensors of the IoT device may be damaged, and/or interference may exist in a communication channel used by the IoT device to transmit the indication of the position fix and/or the sensor data to the FMS backend. The IoT device may wakeup and attempt to perform the position fix and/or collect the sensor data at the predefined intervals regardless of whether the IoT device will be able to successfully perform the position fix and/or collect the sensor data and regardless of whether the IoT device will be able to successfully transmit the indication of the position fix and/or the sensor data to the FMS backend. As the IoT device may have a limited battery life, waking up and unsuccessfully transmitting the indication of the position fix and/or the sensor data to the FMS backend may rapidly drain a battery of the IoT device (e.g., due to processor clock cycles used in repeated failed transmissions and/or due to power used by an antenna of the IoT device in the attempted transmissions), which may impede fleet management by the FMS backend.

Various technologies pertaining to opportunistic position location determination and reporting for asset tracking and monitoring are described herein. In an example, an apparatus (e.g., a UE) receives, from a server, first data that is indicative of a first likelihood of the UE successfully performing at least one of a position fix or a transmission of sensor data based on a first set of characteristics associated with the UE and at least one additional UE. The apparatus (e.g., a UE) computes, based on the first data and a second set of characteristics associated with the UE, a second likelihood of the UE successfully performing at least one of the position fix or the transmission of the sensor data. The apparatus (e.g., a UE) schedules, based on the second likelihood, a wake-up time instance or a sleep time instance. The apparatus (e.g., a UE) transitions the UE (1) from a sleep state to an active state at the wake-up time instance or (2) from the active state to the sleep state at the sleep time instance. Vis-à-vis computing the second likelihood based on the first likelihood and the second set of characteristics and scheduling the wake-up time instance or the sleep time instance based on the second likelihood, a UE may conserve battery power by opportunistically waking up at a time when performance of the position fix and/or transmission of the sensor data is likely to be successful, as opposed to blindly waking up at a predetermined wake-up time instance where the UE has no knowledge of whether performance of the position fix and/or transmission of the sensor data will be successful. Furthermore, vis-à-vis computing the second likelihood based on the first likelihood and the second set of characteristics and scheduling the wake-up time instance or the sleep time instance based on the second likelihood, the UE may conserve processing power and/or network resources by avoiding performing position fixes and/or transmitting sensor data in situations where position fixes and/or transmitting sensor data are unlikely to be successful.

In another example, an apparatus (e.g., a server) computes a first likelihood of a user equipment (UE) successfully performing at least one of a position fix or a transmission of sensor data based on a first set of characteristics associated with the UE and at least one additional UE. The apparatus (e.g., a server) transmits, to the UE, first data that is indicative of the first likelihood of the UE successfully performing at least one of the position fix or the transmission of the sensor data. The apparatus receives, from the UE, an indication of a second likelihood of the UE successfully performing at least one of the position fix or the transmission of the sensor data. Vis-à-vis transmitting the first data that is indicative of the first likelihood of the UE successfully performing at least one of the position fix or the transmission of the sensor data to the UE and receiving, from the UE, an indication of a second likelihood of the UE successfully performing at least one of the position fix or the transmission of the sensor data, the server may facilitate asset tracking and management of UEs.

The detailed description set forth below in connection with the drawings describes various configurations and does not represent the only configurations in which the concepts described herein may be practiced. The detailed description includes specific details for the purpose of providing a thorough understanding of various concepts. However, these concepts may be practiced without these specific details. In some instances, well known structures and components are shown in block diagram form in order to avoid obscuring such concepts.

Several aspects of telecommunication systems are presented with reference to various apparatus and methods. These apparatus and methods are described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. When multiple processors are implemented, the multiple processors may perform the functions individually or in combination. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software, whether referred to as software, firmware, middleware, microcode, hardware description language, or otherwise, shall be construed broadly to mean instructions, instruction sets, code, code segments, program code, programs, subprograms, software components, applications, software applications, software packages, routines, subroutines, objects, executables, threads of execution, procedures, functions, or any combination thereof.

Accordingly, in one or more example aspects, implementations, and/or use cases, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, such computer-readable media can include a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be used to store computer executable code in the form of instructions or data structures that can be accessed by a computer.

While aspects, implementations, and/or use cases are described in this application by illustration to some examples, additional or different aspects, implementations and/or use cases may come about in many different arrangements and scenarios. Aspects, implementations, and/or use cases described herein may be implemented across many differing platform types, devices, systems, shapes, sizes, and packaging arrangements. For example, aspects, implementations, and/or use cases may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described examples may occur. Aspects, implementations, and/or use cases may range a spectrum from chip-level or modular components to non-modular, non-chip-level implementations and further to aggregate, distributed, or original equipment manufacturer (OEM) devices or systems incorporating one or more techniques herein. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). Techniques described herein may be practiced in a wide variety of devices, chip-level components, systems, distributed arrangements, aggregated or disaggregated components, end-user devices, etc. of varying sizes, shapes, and constitution.

Deployment of communication systems, such as 5G NR systems, may be arranged in multiple manners with various components or constituent parts. In a 5G NR system, or network, a network node, a network entity, a mobility element of a network, a radio access network (RAN) node, a core network node, a network element, or a network equipment, such as a base station (BS), or one or more units (or one or more components) performing base station functionality, may be implemented in an aggregated or disaggregated architecture. For example, a BS (such as a Node B (NB), evolved NB (eNB), NR BS, 5G NB, access point (AP), a transmission reception point (TRP), or a cell, etc.) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more central or centralized units (CUs), one or more distributed units (DUs), or one or more radio units (RUS)). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU and RU can be implemented as virtual units, i.e., a virtual central unit (VCU), a virtual distributed unit (VDU), or a virtual radio unit (VRU).

Base station operation or network design may consider aggregation characteristics of base station functionality. For example, disaggregated base stations may be utilized in an integrated access backhaul (IAB) network, an open radio access network (O-RAN (such as the network configuration sponsored by the O-RAN Alliance)), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

FIG. 1 is a diagram 100 illustrating an example of a wireless communications system and an access network. The illustrated wireless communications system includes a disaggregated base station architecture. The disaggregated base station architecture may include one or more CUs 110 that can communicate directly with a core network 120 via a backhaul link, or indirectly with the core network 120 through one or more disaggregated base station units (such as a Near-Real Time (Near-RT) RAN Intelligent Controller (RIC) 125 via an E2 link, or a Non-Real Time (Non-RT) RIC 115 associated with a Service Management and Orchestration (SMO) Framework 105, or both). A CU 110 may communicate with one or more DUs 130 via respective midhaul links, such as an F1 interface. The DUs 130 may communicate with one or more RUs 140 via respective fronthaul links. The RUs 140 may communicate with respective UEs 104 via one or more radio frequency (RF) access links. In some implementations, the UE 104 may be simultaneously served by multiple RUs 140.

Each of the units, i.e., the CUS 110, the DUs 130, the RUs 140, as well as the Near-RT RICs 125, the Non-RT RICs 115, and the SMO Framework 105, may include one or more interfaces or be coupled to one or more interfaces configured to receive or to transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or to transmit signals over a wired transmission medium to one or more of the other units. Additionally, the units can include a wireless interface, which may include a receiver, a transmitter, or a transceiver (such as an RF transceiver), configured to receive or to transmit signals, or both, over a wireless transmission medium to one or more of the other units.

In some aspects, the CU 110 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 110. The CU 110 may be configured to handle user plane functionality (i.e., Central Unit-User Plane (CU-UP)), control plane functionality (i.e., Central Unit-Control Plane (CU-CP)), or a combination thereof. In some implementations, the CU 110 can be logically split into one or more CU-UP units and one or more CU-CP units. The CU-UP unit can communicate bidirectionally with the CU-CP unit via an interface, such as an E1 interface when implemented in an O-RAN configuration. The CU 110 can be implemented to communicate with the DU 130, as necessary, for network control and signaling.

The DU 130 may correspond to a logical unit that includes one or more base station functions to control the operation of one or more RUs 140. In some aspects, the DU 130 may host one or more of a radio link control (RLC) layer, a medium access control (MAC) layer, and one or more high physical (PHY) layers (such as modules for forward error correction (FEC) encoding and decoding, scrambling, modulation, demodulation, or the like) depending, at least in part, on a functional split, such as those defined by 3GPP. In some aspects, the DU 130 may further host one or more low PHY layers. Each layer (or module) can be implemented with an interface configured to communicate signals with other layers (and modules) hosted by the DU 130, or with the control functions hosted by the CU 110.

Lower-layer functionality can be implemented by one or more RUs 140. In some deployments, an RU 140, controlled by a DU 130, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 140 can be implemented to handle over the air (OTA) communication with one or more UEs 104. In some implementations, real-time and non-real-time aspects of control and user plane communication with the RU(s) 140 can be controlled by the corresponding DU 130. In some scenarios, this configuration can enable the DU(s) 130 and the CU 110 to be implemented in a cloud-based RAN architecture, such as a vRAN architecture.

The SMO Framework 105 may be configured to support RAN deployment and provisioning of non-virtualized and virtualized network elements. For non-virtualized network elements, the SMO Framework 105 may be configured to support the deployment of dedicated physical resources for RAN coverage requirements that may be managed via an operations and maintenance interface (such as an O1 interface). For virtualized network elements, the SMO Framework 105 may be configured to interact with a cloud computing platform (such as an open cloud (O-Cloud) 190) to perform network element life cycle management (such as to instantiate virtualized network elements) via a cloud computing platform interface (such as an O2 interface). Such virtualized network elements can include, but are not limited to, CUs 110, DUs 130, RUs 140 and Near-RT RICs 125. In some implementations, the SMO Framework 105 can communicate with a hardware aspect of a 4G RAN, such as an open eNB (O-eNB) 111, via an O1 interface. Additionally, in some implementations, the SMO Framework 105 can communicate directly with one or more RUs 140 via an O1 interface. The SMO Framework 105 also may include a Non-RT RIC 115 configured to support functionality of the SMO Framework 105.

The Non-RT RIC 115 may be configured to include a logical function that enables non-real-time control and optimization of RAN elements and resources, artificial intelligence (AI)/machine learning (ML) (AI/ML) workflows including model training and updates, or policy-based guidance of applications/features in the Near-RT RIC 125. The Non-RT RIC 115 may be coupled to or communicate with (such as via an A1 interface) the Near-RT RIC 125. The Near-RT RIC 125 may be configured to include a logical function that enables near-real-time control and optimization of RAN elements and resources via data collection and actions over an interface (such as via an E2 interface) connecting one or more CUs 110, one or more DUs 130, or both, as well as an O-eNB, with the Near-RT RIC 125.

In some implementations, to generate AI/ML models to be deployed in the Near-RT RIC 125, the Non-RT RIC 115 may receive parameters or external enrichment information from external servers. Such information may be utilized by the Near-RT RIC 125 and may be received at the SMO Framework 105 or the Non-RT RIC 115 from non-network data sources or from network functions. In some examples, the Non-RT RIC 115 or the Near-RT RIC 125 may be configured to tune RAN behavior or performance. For example, the Non-RT RIC 115 may monitor long-term trends and patterns for performance and employ AI/ML models to perform corrective actions through the SMO Framework 105 (such as reconfiguration via 01) or via creation of RAN management policies (such as A1 policies).

At least one of the CU 110, the DU 130, and the RU 140 may be referred to as a base station 102. Accordingly, a base station 102 may include one or more of the CU 110, the DU 130, and the RU 140 (each component indicated with dotted lines to signify that each component may or may not be included in the base station 102). The base station 102 provides an access point to the core network 120 for a UE 104. The base station 102 may include macrocells (high power cellular base station) and/or small cells (low power cellular base station). The small cells include femtocells, picocells, and microcells. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links between the RUs 140 and the UEs 104 may include uplink (UL) (also referred to as reverse link) transmissions from a UE 104 to an RU 140 and/or downlink (DL) (also referred to as forward link) transmissions from an RU 140 to a UE 104. The communication links may use multiple-input and multiple-output (MIMO) antenna technology, including spatial multiplexing, beamforming, and/or transmit diversity. The communication links may be through one or more carriers. The base station 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL wireless wide area network (WWAN) spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, Bluetooth™ (Bluetooth is a trademark of the Bluetooth Special Interest Group (SIG)), Wi-Fi™ (Wi-Fi is a trademark of the Wi-Fi Alliance) based on the Institute of Electrical and Electronics Engineers (IEEE) 802.11 standard, LTE, or NR.

The wireless communications system may further include a Wi-Fi AP 150 in communication with UEs 104 (also referred to as Wi-Fi stations (STAs)) via communication link 154, e.g., in a 5 GHz unlicensed frequency spectrum or the like. When communicating in an unlicensed frequency spectrum, the UEs 104/AP 150 may perform a clear channel assessment (CCA) prior to communicating in order to determine whether the channel is available.

The electromagnetic spectrum is often subdivided, based on frequency/wavelength, into various classes, bands, channels, etc. In 5G NR, two initial operating bands have been identified as frequency range designations FR1 (410 MHz-7.125 GHZ) and FR2 (24.25 GHz-52.6 GHz). Although a portion of FR1 is greater than 6 GHZ, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHZ-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHZ-24.25

GHZ). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR2-2 (52.6 GHZ-71 GHz), FR4 (71 GHz-114.25 GHZ), and FR5 (114.25 GHZ-300 GHz). Each of these higher frequency bands falls within the EHF band.

With the above aspects in mind, unless specifically stated otherwise, the term "sub-6 GHz" or the like if used herein may broadly represent frequencies that may be less than 6 GHZ, may be within FR1, or may include mid-band frequencies. Further, unless specifically stated otherwise, the term "millimeter wave" or the like if used herein may broadly represent frequencies that may include mid-band frequencies, may be within FR2, FR4, FR2-2, and/or FR5, or may be within the EHF band.

The base station 102 and the UE 104 may each include a plurality of antennas, such as antenna elements, antenna panels, and/or antenna arrays to facilitate beamforming. The base station 102 may transmit a beamformed signal 182 to the UE 104 in one or more transmit directions. The UE 104 may receive the beamformed signal from the base station 102 in one or more receive directions. The UE 104 may also transmit a beamformed signal 184 to the base station 102 in one or more transmit directions. The base station 102 may receive the beamformed signal from the UE 104 in one or more receive directions. The base station 102/UE 104 may perform beam training to determine the best receive and transmit directions for each of the base station 102/UE 104. The transmit and receive directions for the base station 102 may or may not be the same. The transmit and receive directions for the UE 104 may or may not be the same.

The base station 102 may include and/or be referred to as a gNB, Node B, eNB, an access point, a base transceiver station, a radio base station, a radio transceiver, a transceiver function, a basic service set (BSS), an extended service set (ESS), a TRP, network node, network entity, network equipment, or some other suitable terminology. The base station 102 can be implemented as an integrated access and backhaul (IAB) node, a relay node, a sidelink node, an aggregated (monolithic) base station with a baseband unit (BBU) (including a CU and a DU) and an RU, or as a disaggregated base station including one or more of a CU, a DU, and/or an RU. The set of base stations, which may include disaggregated base stations and/or aggregated base stations, may be referred to as next generation (NG) RAN (NG-RAN).

The core network 120 may include an Access and Mobility Management Function (AMF) 161, a Session Management Function (SMF) 162, a User Plane Function (UPF) 163, a Unified Data Management (UDM) 164, one or more location servers 168, and other functional entities. The AMF 161 is the control node that processes the signaling between the UEs 104 and the core network 120. The AMF 161 supports registration management, connection management, mobility management, and other functions. The SMF 162 supports session management and other functions. The UPF 163 supports packet routing, packet forwarding, and other functions. The UDM 164 supports the generation of authentication and key agreement (AKA) credentials, user identification handling, access authorization, and subscription management. The one or more location servers 168 are illustrated as including a Gateway Mobile Location Center (GMLC) 165 and a Location Management Function (LMF) 166. However, generally, the one or more location servers 168 may include one or more location/positioning servers, which may include one or more of the GMLC 165, the LMF 166, a position determination entity (PDE), a serving mobile location center (SMLC), a mobile positioning center (MPC), or the like. The GMLC 165 and the LMF 166 support UE location services. The GMLC 165 provides an interface for clients/applications (e.g., emergency services) for accessing UE positioning information. The LMF 166 receives measurements and assistance information from the NG-RAN and the UE 104 via the AMF 161 to compute the position of the UE 104. The NG-RAN may utilize one or more positioning methods in order to determine the position of the UE 104. Positioning the UE 104 may involve signal measurements, a position estimate, and an optional velocity computation based on the measurements. The signal measurements may be made by the UE 104 and/or the base station 102 serving the UE 104. The signals measured may be based on one or more of a satellite positioning system (SPS) 170 (e.g., one or more of a Global Navigation Satellite System (GNSS), global position system (GPS), non-terrestrial network (NTN), or other satellite position/location system), LTE signals, wireless local area network (WLAN) signals, Bluetooth signals, a terrestrial beacon system (TBS), sensor-based information (e.g., barometric pressure sensor, motion sensor), NR enhanced cell ID (NR E-CID) methods, NR signals (e.g., multi-round trip time (Multi-RTT), DL angle-of-departure (DL-AoD), DL time difference of arrival (DL-TDOA), UL time difference of arrival (UL-TDOA), and UL angle-of-arrival (UL-AoA) positioning), and/or other systems/signals/sensors.

Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. In some scenarios, the term UE may also apply to one or more companion devices such as in a device constellation arrangement. One or more of these devices may collectively access the network and/or individually access the network.

Referring again to FIG. 1, in certain aspects, the UE 104 may have an asset tracking and monitoring component 198 that may be configured to receive, from a server, first data that is indicative of a first likelihood of the UE successfully performing at least one of a position fix or a transmission of sensor data based on a first set of characteristics associated with the UE and at least one additional UE; compute, based on the first data and a second set of characteristics associated with the UE, a second likelihood of the UE successfully performing at least one of the position fix or the transmission of the sensor data; schedule, based on the second likelihood, a wake-up time instance or a sleep time instance; and transition the UE (1) from a sleep state to an active state at the wake-up time instance or (2) from the active state to the sleep state at the sleep time instance. In certain aspects, the base station 102 or a server may have an asset tracking and monitoring component 199 that may be configured to compute a first likelihood of a user equipment (UE) successfully performing at least one of a position fix or a transmission of sensor data based on a first set of characteristics associated with the UE and at least one additional UE; transmit, to the UE, first data that is indicative of the first likelihood of the UE successfully performing at least one of the position fix or the transmission of the sensor data; and receive, from the UE, an indication of a second likelihood of the UE successfully performing at least one of the position fix or the transmission of the sensor data. Although the description herein may be focused on IoT devices and fleet management systems, the concepts described herein may be applicable to other types of devices and systems as well.

Figures 2A, 2B, 2C, 2D:
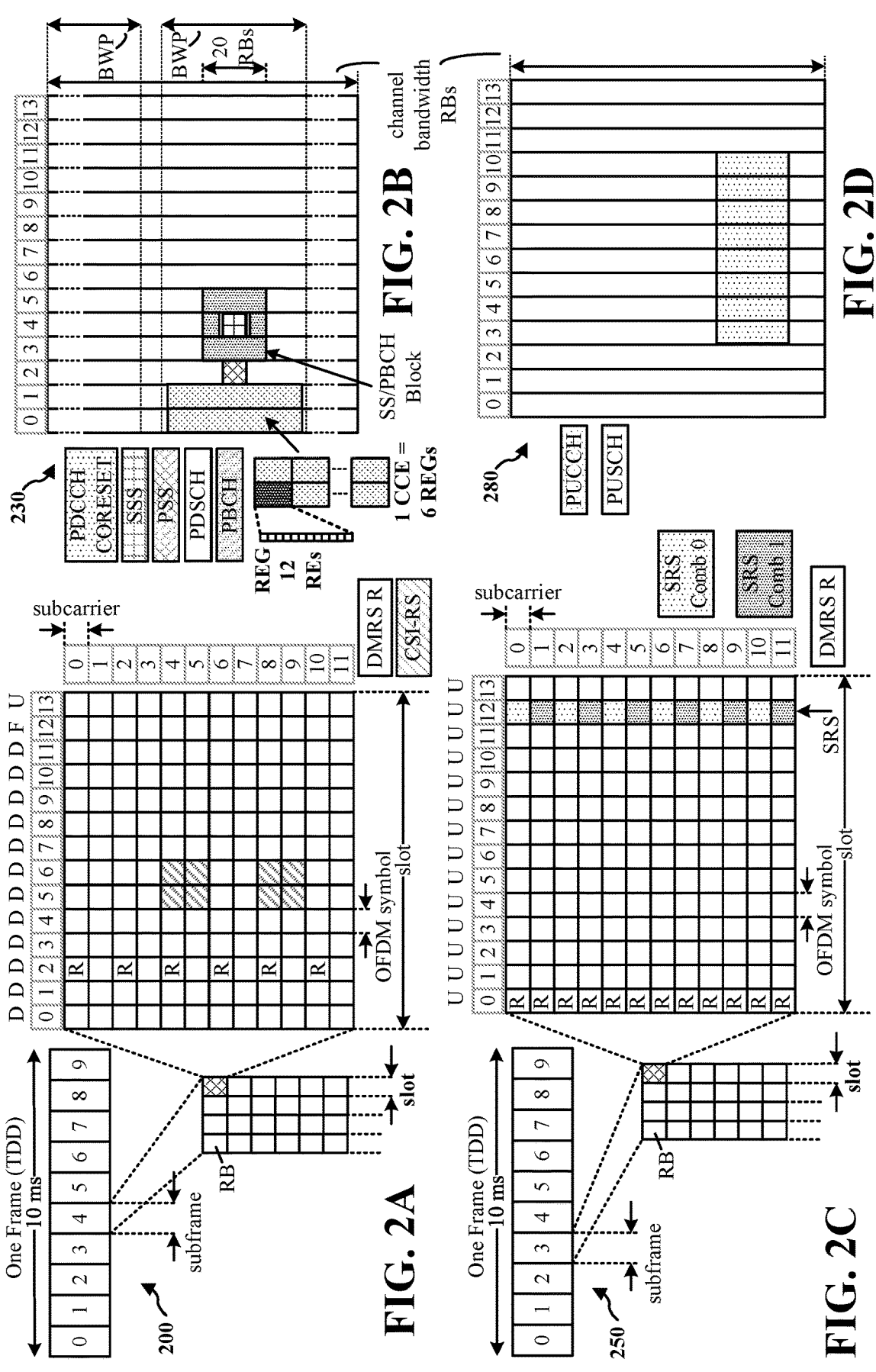
FIG. 2A is a diagram illustrating an example of a first frame, in accordance with various aspects of the present disclosure.
FIG. 2B is a diagram illustrating an example of downlink (DL) channels within a subframe, in accordance with various aspects of the present disclosure.
FIG. 2C is a diagram illustrating an example of a second frame, in accordance with various aspects of the present disclosure.
FIG. 2D is a diagram illustrating an example of uplink (UL) channels within a subframe, in accordance with various aspects of the present disclosure.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

FIGS. 2A-2D illustrate a frame structure, and the aspects of the present disclosure may be applicable to other wireless communication technologies, which may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 14 or 12 symbols, depending on whether the cyclic prefix (CP) is normal or extended. For normal CP, each slot may include 14 symbols, and for extended CP, each slot may include 12 symbols. The symbols on DL may be CP orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (for power limited scenarios; limited to a single stream transmission). The number of slots within a subframe is based on the CP and the numerology. The numerology defines the subcarrier spacing (SCS) (see Table 1). The symbol length/duration may scale with 1/SCS.

TABLE 1

| | Numerology, SCS, and CP | |
|---|---|---|
| μ | SCS Δf = $2^\mu \cdot 15$[kHz] | Cyclic prefix |
| 0 | 15 | Normal |
| 1 | 30 | Normal |
| 2 | 60 | Normal, Extended |
| 3 | 120 | Normal |
| 4 | 240 | Normal |
| 5 | 480 | Normal |
| 6 | 960 | Normal |

For normal CP (14 symbols/slot), different numerologies μ 0 to 4 allow for 1, 2, 4, 8, and 16 slots, respectively, per subframe. For extended CP, the numerology 2 allows for 4 slots per subframe. Accordingly, for normal CP and numerology μ, there are 14 symbols/slot and $2^\mu$ slots/subframe. The subcarrier spacing may be equal to $2^\mu*15$ kHz, where μ is the numerology 0 to 4. As such, the numerology μ=0 has a subcarrier spacing of 15 kHz and the numerology μ=4 has a subcarrier spacing of 240 kHz. The symbol length/duration is inversely related to the subcarrier spacing. FIGS. 2A-2D provide an example of normal CP with 14 symbols per slot and numerology μ=2 with 4 slots per subframe. The slot duration is 0.25 ms, the subcarrier spacing is 60 kHz, and the symbol duration is approximately 16.67 μs. Within a set of frames, there may be one or more different bandwidth parts (BWPs) (see FIG. 2B) that are frequency division multiplexed. Each BWP may have a particular numerology and CP (normal or extended).

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) feedback (i.e., one or more HARQ ACK bits indicating one or more ACK and/or negative ACK (NACK)). The PUSCH carries data, and may additionally be used to carry a buffer status report (BSR), a power headroom report (PHR), and/or UCI.

Figure 3:
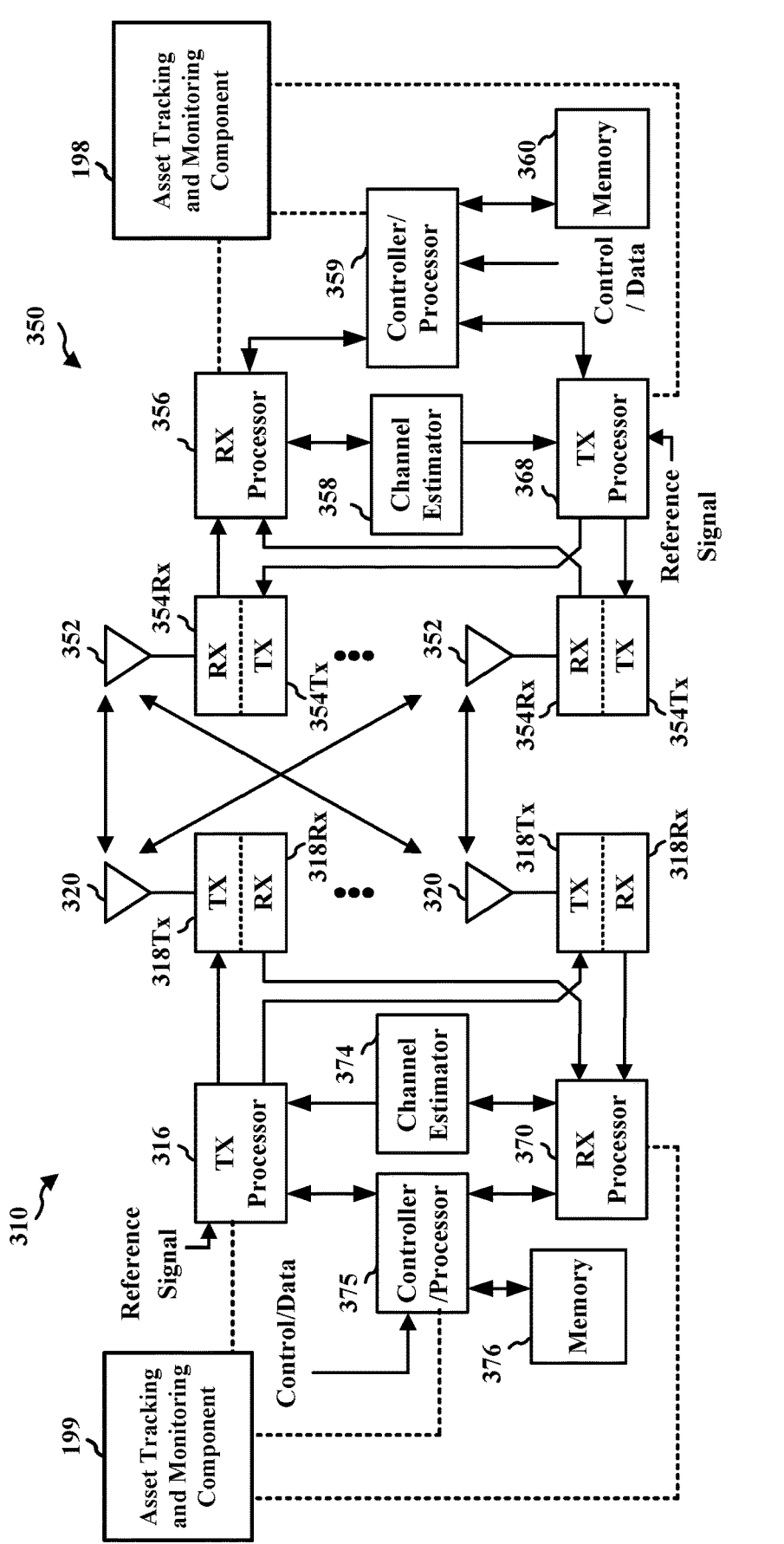
FIG. 3 is a diagram illustrating an example of a base station and user equipment (UE) in an access network.

FIG. 3 is a block diagram of a base station 310 in communication with a UE 350 in an access network. In the DL, Internet protocol (IP) packets may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318Tx. Each transmitter 318Tx may modulate a radio frequency (RF) carrier with a respective spatial stream for transmission.

At the UE 350, each receiver 354Rx receives a signal through its respective antenna 352. Each receiver 354Rx recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal includes a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with at least one memory 360 that stores program codes and data. The at least one memory 360 may be referred to as a computer-readable medium. In the UL, the controller/processor 359 provides demultiplexing between transport and logical channels, packet reassembly, deciphering, header decompression, and control signal processing to recover IP packets. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354Tx. Each transmitter 354Tx may modulate an RF carrier with a respective spatial stream for transmission.

The UL transmission is processed at the base station 310 in a manner similar to that described in connection with the receiver function at the UE 350. Each receiver 318Rx receives a signal through its respective antenna 320. Each receiver 318Rx recovers information modulated onto an RF carrier and provides the information to a RX processor 370.

The controller/processor 375 can be associated with at least one memory 376 that stores program codes and data. The at least one memory 376 may be referred to as a computer-readable medium. In the UL, the controller/processor 375 provides demultiplexing between transport and logical channels, packet reassembly, deciphering, header decompression, control signal processing to recover IP packets. The controller/processor 375 is also responsible for error detection using an ACK and/or NACK protocol to support HARQ operations.

At least one of the TX processor 368, the RX processor 356, and the controller/processor 359 may be configured to perform aspects in connection with the asset tracking and monitoring component 198 of FIG. 1.

At least one of the TX processor 316, the RX processor 370, and the controller/processor 375 may be configured to perform aspects in connection with the asset tracking and monitoring component 199 of FIG. 1.

Figure 4:
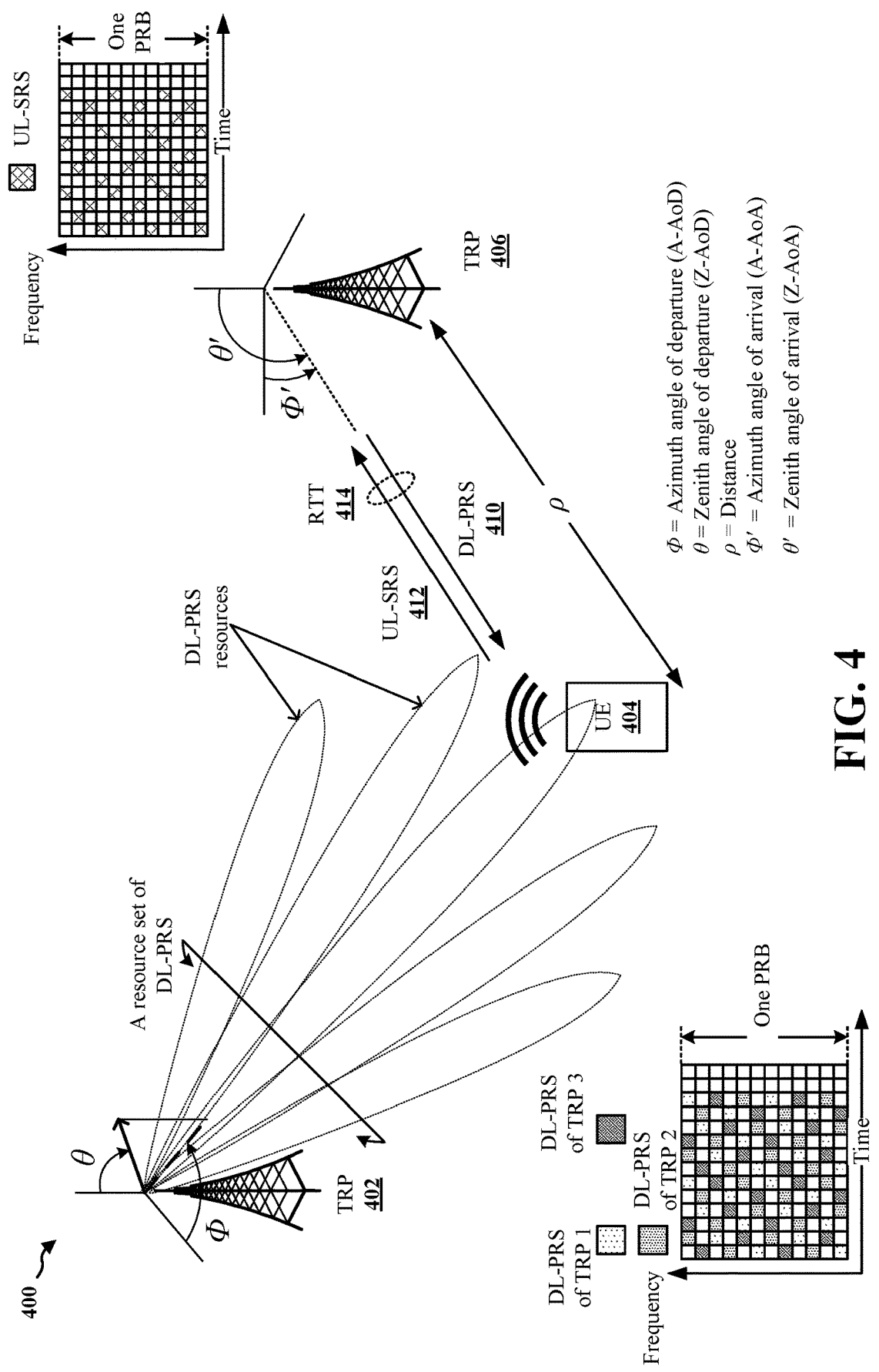
FIG. 4 is a diagram illustrating an example of a UE positioning based on reference signal measurements.

FIG. 4 is a diagram 400 illustrating an example of a UE positioning based on reference signal measurements. The UE 404 may transmit UL-SRS 412 at time $T_{SRS\_TX}$ and receive DL positioning reference signals (PRS) (DL-PRS) 410 at time $T_{PRS\_RX}$. The TRP 406 may receive the UL-SRS 412 at time $T_{SRS\_RX}$ and transmit the DL-PRS 410 at time $T_{PRS\_TX}$. The UE 404 may receive the DL-PRS 410 before transmitting the UL-SRS 412, or may transmit the UL-SRS 412 before receiving the DL-PRS 410. In both cases, a positioning server (e.g., location server(s) 168) or the UE 404 may determine the RTT 414 based on $\|T_{SRS\_RX}-T_{PRS\_TX}\|-\|T_{SRS\_TX}-T_{PRS\_RX}\|$. Accordingly, multi-RTT positioning may make use of the UE Rx–Tx time difference measurements (i.e., $\|T_{SRS\_TX}-T_{PRS\_RX}\|$) and DL-PRS reference signal received power (RSRP) (DL-PRS-RSRP) of downlink signals received from multiple TRPs 402, 406 and measured by the UE 404, and the measured TRP Rx–Tx time difference measurements (i.e., $|T_{SRS\_RX}-T_{PRS\_TX}|$) and UL-SRS-RSRP at multiple TRPs 402, 406 of uplink signals transmitted from UE 404. The UE 404 measures the UE Rx–Tx time difference measurements (and optionally DL-PRS-RSRP of the received signals) using assistance data received from the positioning server, and the TRPs 402, 406 measure the gNB Rx–Tx time difference measurements (and optionally UL-SRS-RSRP of the received signals) using assistance data received from the positioning server. The measurements may be used at the positioning server or the UE 404 to determine the RTT, which is used to estimate the location of the UE 404. Other methods are possible for determining the RTT, such as for example using DL-TDOA and/or UL-TDOA measurements.

DL-AoD positioning may make use of the measured DL-PRS-RSRP of downlink signals received from multiple TRPs 402, 406 at the UE 404. The UE 404 measures the DL-PRS-RSRP of the received signals using assistance data received from the positioning server, and the resulting measurements are used along with the azimuth angle of departure (A-AoD), the zenith angle of departure (Z-AoD), and other configuration information to locate the UE 404 in relation to the neighboring TRPs 402, 406.

DL-TDOA positioning may make use of the DL reference signal time difference (RSTD) (and optionally DL-PRS-RSRP) of downlink signals received from multiple TRPs 402, 406 at the UE 404. The UE 404 measures the DL RSTD (and optionally DL-PRS-RSRP) of the received signals using assistance data received from the positioning server, and the resulting measurements are used along with other configuration information to locate the UE 404 in relation to the neighboring TRPs 402, 406.

UL-TDOA positioning may make use of the UL relative time of arrival (RTOA) (and optionally UL-SRS-RSRP) at multiple TRPs 402, 406 of uplink signals transmitted from UE 404. The TRPs 402, 406 measure the UL-RTOA (and optionally UL-SRS-RSRP) of the received signals using assistance data received from the positioning server, and the resulting measurements are used along with other configuration information to estimate the location of the UE 404.

UL-AoA positioning may make use of the measured azimuth angle of arrival (A-AoA) and zenith angle of arrival (Z-AoA) at multiple TRPs 402, 406 of uplink signals transmitted from the UE 404. The TRPs 402, 406 measure the A-AoA and the Z-AoA of the received signals using assistance data received from the positioning server, and the resulting measurements are used along with other configuration information to estimate the location of the UE 404.

Additional positioning methods may be used for estimating the location of the UE 404, such as for example, UE-side UL-AoD and/or DL-AoA. Note that data/measurements from various technologies may be combined in various ways to increase accuracy, to determine and/or to enhance certainty, to supplement/complement measurements, and/or to substitute/provide for missing information.

An Internet of Things (IoT) device may refer to a device that includes sensors, processor(s), software, and other technologies that connect and exchange data with other devices (e.g., other IoT devices, a server, etc.) and systems over a network (e.g., the Internet). IoT devices may be part of a fleet of IoT devices managed by a fleet management system (FMS) backend (e.g., a server, a cloud server, etc.). In an example, the fleet of IoT devices may be included in/implemented on vehicles that travel over a geographic area. The IoT devices may be configured to wake up at predefined intervals in order to perform a position fix (e.g., determine a location of an IoT device by way of a global navigation satellite system (GNSS)) and/or to collect sensor data (e.g., perform temperature measurements, capture images, etc.). The IoT devices may then transmit an indication of the position fix and/or the sensor data to the FMS backend, where the FMS backend may utilize the position fix and/or the sensor data to manage the IoT devices and/or to perform other functionality.

In some scenarios, an IoT device may be (1) unable to perform the position fix, (2) unable to collect the sensor data, and/or (3) unable to transmit the indication of the position fix or the sensor data. For instance, conditions in an environment of the IoT device may prevent the IoT device from being able to perform the position fix, sensors of the IoT device may be damaged, and/or interference may exist in a communication channel used by the IoT device to transmit the indication of the position fix and/or the sensor data to the FMS backend. The IoT device may wakeup and attempt to perform the position fix and/or collect the sensor data at the predefined intervals regardless of whether the IoT device will be able to successfully perform the position fix and/or collect the sensor data and regardless of whether the IoT device will be able to successfully transmit the indication of the position fix and/or the sensor data to the FMS backend. As the IoT device may have a limited battery life, waking up and unsuccessfully transmitting the indication of the position fix and/or the sensor data to the FMS backend may rapidly drain a battery of the IoT device (e.g., due to processor clock cycles used in repeated failed transmissions and/or due to power used by an antenna of the IoT device in the attempted transmissions), which may impede fleet management by the FMS backend.

Various technologies pertaining to opportunistic position location determination and reporting for asset tracking and monitoring are described herein. In an example, an apparatus (e.g., a UE) receives, from a server, first data that is indicative of a first likelihood of the UE successfully performing at least one of a position fix or a transmission of sensor data based on a first set of characteristics associated with the UE and at least one additional UE. The apparatus (e.g., a UE) computes, based on the first data and a second set of characteristics associated with the UE, a second likelihood of the UE successfully performing at least one of the position fix or the transmission of the sensor data. The apparatus (e.g., a UE) schedules, based on the second likelihood, a wake-up time instance or a sleep time instance. The apparatus (e.g., a UE) transitions the UE (1) from a sleep state to an active state at the wake-up time instance or (2) from the active state to the sleep state at the sleep time instance. Vis-à-vis computing the second likelihood based on the first likelihood and the second set of characteristics and scheduling the wake-up time instance or the sleep time instance based on the second likelihood, a UE may conserve battery power by opportunistically waking up at a time when performance of the position fix and/or transmission of the sensor data is likely to be successful, as opposed to blindly waking up at a predetermined wake-up time instance where the UE has no knowledge of whether performance of the position fix and/or transmission of the sensor data will be successful. Furthermore, vis-à-vis computing the second likelihood based on the first likelihood and the second set of characteristics and scheduling the wake-up time instance or the sleep time instance based on the second likelihood, the UE may conserve processing power and/or network resources by avoiding performing position fixes and/or transmitting sensor data in situations where position fixes and/or transmitting sensor data are unlikely to be successful.

In another example, an apparatus (e.g., a server) computes a first likelihood of a user equipment (UE) successfully performing at least one of a position fix or a transmission of sensor data based on a first set of characteristics associated with the UE and at least one additional UE. The apparatus (e.g., a server) transmits, to the UE, first data that is indicative of the first likelihood of the UE successfully performing at least one of the position fix or the transmission of the sensor data. The apparatus receives, from the UE, an indication of a second likelihood of the UE successfully performing at least one of the position fix or the transmission of the sensor data. Vis-à-vis transmitting the first data that is indicative of the first likelihood of the UE successfully performing at least one of the position fix or the transmission of the sensor data to the UE and receiving, from the UE, an indication of a second likelihood of the UE successfully performing at least one of the position fix or the transmission of the sensor data, the server may facilitate asset tracking and management of UEs.

Some approaches for asset tracking and monitoring may not consider connectivity/coverage conditions of UEs. If a device wakes up at its periodic interval and performs a GPS fix and wireless connectivity (e.g., cellular, WLAN, satellite, etc.) is poor, the device may not be able to send data to the server. In one aspect, an improved fleet management system is described herein in which UEs wake up to perform position fixes and in which the UEs transmit in high probability situations (as opposed to low probability situations). This can be predicted by artificial intelligence (AI)/machine learning (ML) based on knowledge from previous devices that experienced similar conditions. Using this information passed from a backend to the device, the device may run a local ML/AI engine to determine a suitable course of action to take to conserve battery based on reporting criteria of the device and current conditions.

Figure 5:
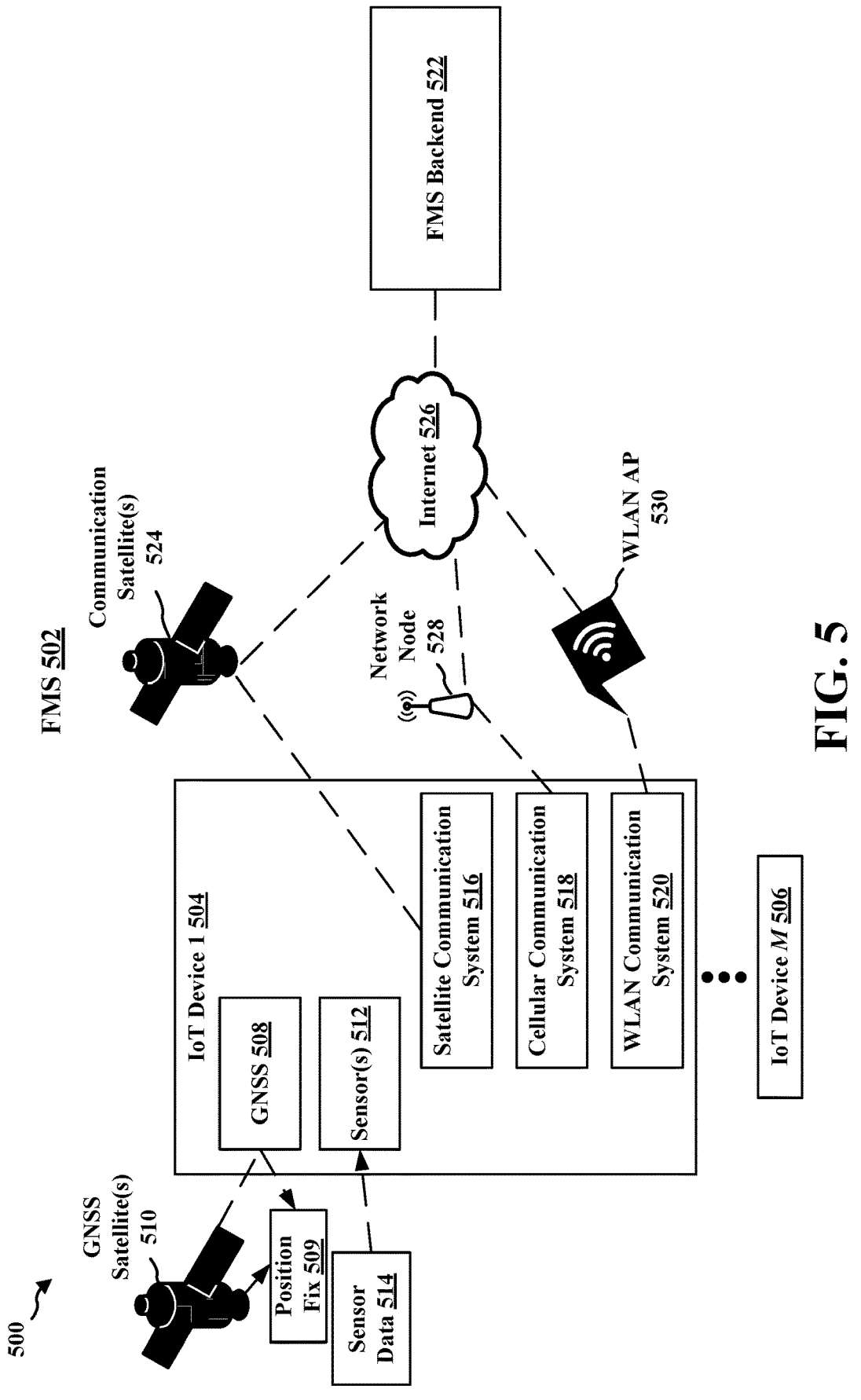
FIG. 5 is a diagram illustrating an example of a fleet management system (FMS).

FIG. 5 is a diagram 500 illustrating an example of a fleet management system (FMS) 502. An FMS may refer to a system that is used for tracking and monitoring assets. In an example, an FMS may track and monitor vehicles travelling in an environment. An FMS may include IoT devices (e.g., UEs), an FMS backend (e.g., a server, a cloud server, etc.), and wireless connectivity elements (e.g., base stations, satellites, wireless access points (APs), etc.) that connect the IoT devices to the FMS backend. An IoT device may include a position fix unit, a health/sensor monitoring unit, and a connectivity unit. The position fix unit may be a GNSS (e.g., GPS) positioning unit, a WLAN positioning unit, or a cellular (e.g., 5G NR) positioning unit. The health/sensor monitoring unit may be or include a thermometer, a camera, a video camera, a battery life measurer, an accelerometer, an inertial measurement unit (IMU), a microphone, a pressure sensor, a light sensor, an infrared sensor, an ultraviolet (UV) light sensor, a barometer, an ohmmeter, a voltmeter, etc. In an example, the health/sensor monitoring unit may collect/generate/capture/obtain temperature measurements, camera images, video images, indications of battery life, acceleration measurements, velocity measurement, six degrees of freedom (6DOF) measurements, audio data, pressure measurements, indications of light, indications of infrared light, indications of UV light, atmospheric pressure measurements, current measurements, voltage measurements, etc. The FMS backend may be configured to process and analyze data received from the IoT devices, identify anomalies based on the data and/or based on other data, and update locations and health statuses of the IoT devices. In an example, the FMS backend may be a storage and analytic cloud.

In an example, the FMS 502 may include a first IoT device 504 and an Mth IoT device 506, where M is a positive integer greater than one. The first IoT device 504 and the Mth IoT device 506 may be referred to collectively as a fleet of IoT devices 504-506, IoT devices, etc. In an example, the first IoT device 504 and/or the Mth IoT device 506 may be or include the UE 104, the UE 350, etc. In an example, the first IoT device 504 may be included in/on or integrated into a first vehicle and the Mth IoT device 506 may be included in/on or integrated into a second vehicle. In another example, the first IoT device 504 may be included in/on or integrated into a first shipping container and the Mth IoT device 506 may be included in/on or integrated into a second shipping container. The FMS 502 may also include an FMS backend 522. An FMS backend may be referred to as an FMS server. An FMS server may refer to a server that is configured to perform tasks associated with fleet management.

The first IoT device 504 may include a GNSS 508 (e.g., a position fix unit) that is configured to perform a position fix 509 of the first IoT device 504 based on signals received from a GNSS satellite(s) 510. Performing a position fix may refer to determining a position of a device. With more particularity, the first IoT device 504 may determine a position (e.g., latitude, longitude, altitude, etc.) of the first IoT device 504 via signals transmitted by the GNSS satellite(s) 510 and received by the GNSS 508. Although not depicted in the diagram 500, the first IoT device 504 may also perform the position fix 509 by way of a WLAN based positioning unit and/or by way of a cellular (e.g., 5G NR) based positioning unit.

The first IoT device 504 may include sensor(s) 512 (e.g., a health/sensor monitoring unit). The sensor(s) 512 may be configured to collect/generate/capture/obtain sensor data 514. Sensor data may refer to information, data, and/or signals collected/generated/captured/obtained by a sensor. The sensor(s) 512 may be or include a thermometer, a camera, a video camera, a battery life measurer, an accelerometer, an inertial measurement unit (IMU), a microphone, a pressure sensor, a light sensor, an infrared sensor, an ultraviolet (UV) light sensor, a barometer, an ohmmeter, a voltmeter, etc. The sensor data 514 may be or include temperature measurements, camera images, video images, indications of battery life, acceleration measurements, velocity measurement, six degrees of freedom (6DOF) measurements, audio data, pressure measurements, indications of light, indications of infrared light, indications of UV light, atmospheric pressure measurements, current measurements, voltage measurements, etc.

The first IoT device 504 may include a satellite communication system 516, a cellular communication system 518, and/or a WLAN communication system 520 (e.g., connectivity unit(s)). The satellite communication system 516, the cellular communication system 518, and/or the WLAN communication system 520 may be configured to transmit data to and/or receive data from the FMS backend 522 (or another device). In an example, the satellite communication system 516, the cellular communication system 518, and/or the WLAN communication system 520 may be configured to transmit an indication of the position fix 509 to the FMS backend 522. In another example, the satellite communication system 516, the cellular communication system 518, and/or the WLAN communication system 520 may be configured to transmit the sensor data 514 to the FMS backend 522.

In one example, the satellite communication system 516 may be configured to transmit the position fix 509 and/or the sensor data 514 to communication satellite(s) 524. The communication satellite(s) 524 may transmit, via the Internet 526 (or via other network(s)), the position fix 509 and/or the sensor data 514 to the FMS backend 522. In another example, the cellular communication system 518 (e.g., a 3G cellular communication system, a 4G cellular communication system, a 5G NR cellular communication system, etc.) may be configured to transmit the position fix 509 and/or the sensor data 514 to a network node 528. The network node 528 may be or include a base station (e.g., a gNB), a 4G base station, a 3G base station, etc. The network node 528 may transmit, via the Internet 526 (or via other network(s)), the position fix 509 and/or the sensor data 514 to the FMS backend 522. In yet another example, the WLAN communication system 520 may be configured to transmit the position fix 509 and/or the sensor data 514 to communication satellite(s) 524 to a WLAN AP 530. The WLAN AP 530 may transmit, via the Internet 526 (or via other network(s)), the position fix 509 and/or the sensor data 514 to the FMS backend 522. The communication satellite(s) 524, the network node 528, and/or the WLAN AP 530 may be referred to as wireless connectivity elements.

The FMS backend 522 may be or include a server. In an example, the FMS backend 522 may be or include a cloud server. In one aspect, the FMS backend may be included in the network node 528. Although not depicted in FIG. 5, the FMS backend may include processor(s), memory, data storage, communication system(s), etc. The FMS backend 522 may be configured to process and analyze the position fix 509, the sensor data 514, and/or other data. The FMS backend 522 may be configured to identify anomalies pertaining to the first IoT device 504 and/or the Mth IoT device 506 based on the (processed and analyzed) position fix 509, sensor data 514, and/or other data. The FMS backend 522 may be configured to update a location and health status of the first IoT device 504 and/or the Mth IoT device 506.

In one aspect, the Mth IoT device 506 may include similar or identical system(s) and/or component(s) to those of the first IoT device 504. In another aspect, the Mth IoT device 506 may include different system(s) and/or component(s) compared to those of the first IoT device 504.

In asset tracking, devices (e.g., the fleet of IoT devices 504-506) may periodically wake up and report position fixes (e.g., the position fix 509), sensor data (e.g., the sensor data 514), and/or statuses (e.g., battery levels) to an FMS backend (e.g., the FMS backend 522) which may enable the FMS backend to track locations and monitor the health of the devices. Tracking a device may refer to determining a position of a device so as to ascertain whether or not the device is on a correct path. Monitoring a device may refer to determining a "heartbeat" of the device, that is, determining whether or not the device is operational and determining whether or not the device is operating properly.

Frequencies of position fixes (e.g., the position fix 509) may be based on several factors. For instance, the frequency of position fixes may be based on a granularity of tracking and monitoring. A finer granularity may utilize more frequent position fixes and updates to a server/cloud (e.g., the FMS backend 522). For instance, the frequency of position fixes may be based on a tradeoff between a frequency of an update and power. Higher frequency position fixes may utilize more power on a device (e.g., the first IoT device 504) and hence the device may be configured with a larger battery for higher frequency position fixes such that the device does not run out of battery.

Some approaches to asset tracking and monitoring may not consider connectivity/coverage conditions of a device (e.g., the first IoT device 504). For example, if the device wakes up at a periodic interval (e.g., a preconfigured wake-up time instance) and performs a GPS fix (e.g., the position fix 509) and wireless connectivity (e.g., cellular, WLAN, satellite) is poor, the device may not be able to transmit data (e.g., the position fix 509, the sensor data 514) to a server (e.g., the FMS backend 522). This may waste battery power on the device and may leave a gap in position tracking and/or health monitoring of the device.

The FMS 502 may encounter various challenges in tracking and managing the fleet of IoT devices 504-506. For instance, the first IoT device 504 may wake up at a predetermined interval (e.g., a preconfigured time instance configured by the FMS backend 522) to perform location determination (i.e., the position fix 509) and to send data (e.g., the position fix 509, the sensor data 514) to the FMS backend 522, where the first IoT device 504 may not have knowledge of (1) whether location determination is possible (e.g., due to blockage or poor coverage) and/or (2) whether connectivity is available to send location and health data (e.g., the sensor data 514) to the FMS backend 522. Waking up at the predetermined interval without knowledge of whether location determination is possible and/or without knowledge of whether connectivity is available may lead to wasted power on the first IoT device 504 since the collected data (e.g., the position fix 509, the sensor data 514) may not be able to be transmitted to the FMS backend 522, and hence may not be used for fleet management purposes, particularly for real-time asset management. Furthermore, if the first IoT device 504 does not have knowledge of a connectivity "dead zone" of coverage, the first IoT device 504 may repeatedly attempt to perform location determination (i.e., the position fix 509) and attempt to upload data (e.g., the position fix 509, the sensor data 514). This may potentially quickly drain a battery of the first IoT device 504 and may cause the first IoT device 504 to become non-operational or non-functional due to a lack of battery power. This problem may be exacerbated for connected, small IoT devices with small batteries that may last for an entire management cycle in order for an FMS to operate properly.

Figure 6:
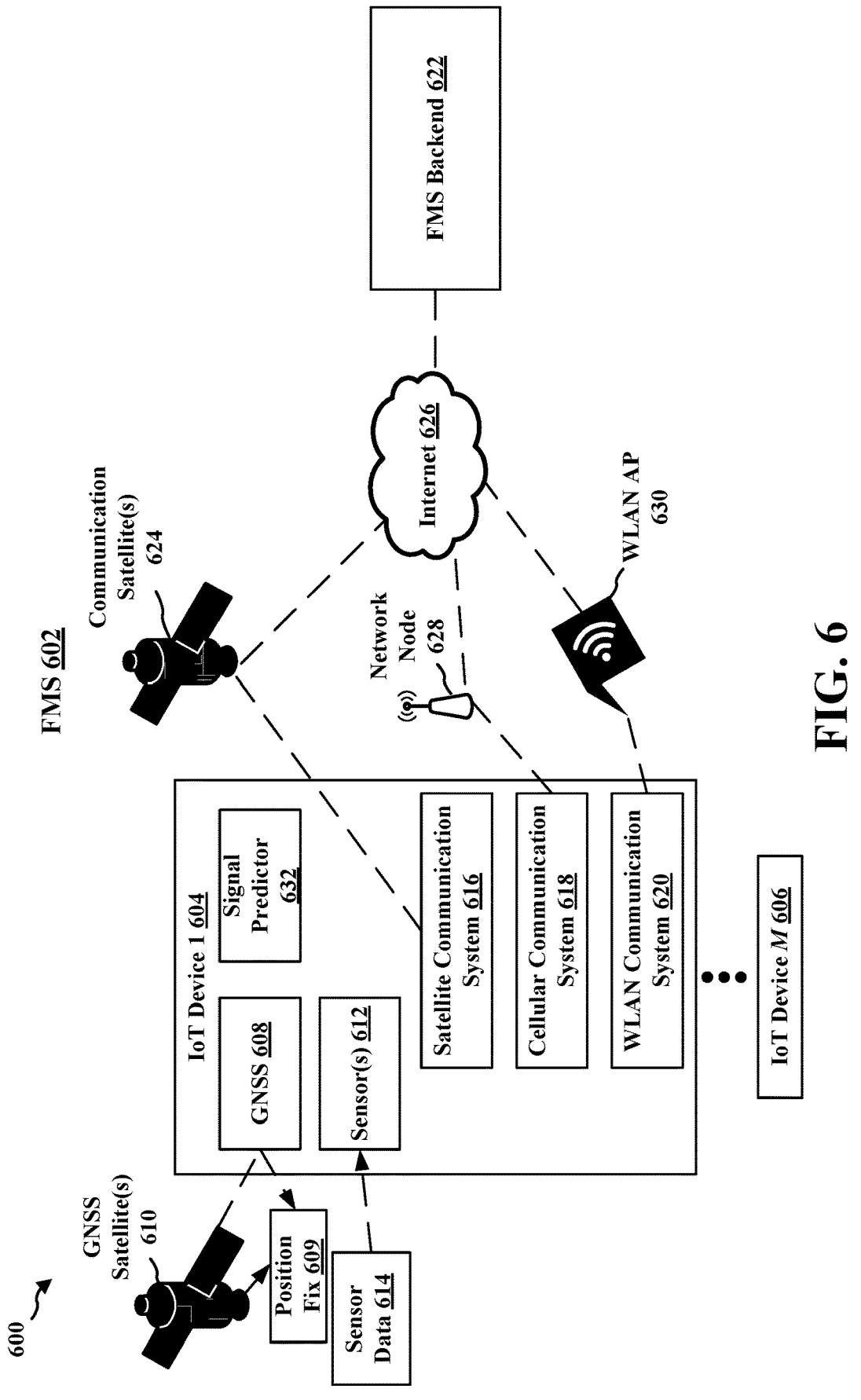
FIG. 6 is a diagram illustrating an example of an FMS.

FIG. 6 is a diagram 600 illustrating an example of an FMS 602. The FMS 602 may be associated with opportunistically performed location fixes (i.e., position fixes) and/or opportunistically reported location and health status data by devices (e.g., IoT devices). In comparison to the FMS 502, the FMS 602 may allow devices to save battery power and may reduce or eliminate gaps in location and health reporting.

In an example, the FMS 602 may include a first IoT device 604 and an Mth IoT device 606, where M is a positive integer greater than one. The first IoT device 604 and the Mth IoT device 606 may be referred to collectively as a fleet of IoT devices 604-606, IoT devices, etc. In an example, the first IoT device 604 and/or the Mth IoT device 606 may be or include the UE 104, the UE 350, etc. In an example, the first IoT device 604 may be included in/on or integrated into a first vehicle and the Mth IoT device 606 may be included in/on or integrated into a second vehicle. In another example, the first IoT device 604 may be included in/on or integrated into a first shipping container and the Mth IoT device 606 may be included in/on or integrated into a second shipping container. The FMS 602 may also include an FMS backend 622.

The first IoT device 604 may include a GNSS 608 (e.g., a position fix unit) that is configured to perform a position fix 609 of the first IoT device 604 based on signals received from a GNSS satellite(s) 610. With more particularity, the first IoT device 604 may determine a position (e.g., latitude, longitude, altitude, etc.) of the first IoT device 604 via signals transmitted by the GNSS satellite(s) 610 and received by the GNSS 608. Although not depicted in the diagram 600, the first IoT device 604 may also perform the position fix 609 by way of a WLAN based positioning unit and/or by way of a cellular (e.g., 5G NR) based positioning unit.

The first IoT device 604 may include sensor(s) 612 (e.g., a health/sensor monitoring unit). The sensor(s) 612 may be configured to collect/generate/capture/obtain sensor data 614. The sensor(s) 612 may be or include a thermometer, a camera, a video camera, a battery life measurer, an accelerometer, an inertial measurement unit (IMU), a microphone, a pressure sensor, a light sensor, an infrared sensor, an ultraviolet (UV) light sensor, a barometer, an ohmmeter, a voltmeter, etc. The sensor data 614 may be or include temperature measurements, camera images, video images, indications of battery life, acceleration measurements, velocity measurement, six degrees of freedom (6DOF) measurements, audio data, pressure measurements, indications of light, indications of infrared light, indications of UV light, atmospheric pressure measurements, current measurements, voltage measurements, etc.

The first IoT device 604 may include a satellite communication system 616, a cellular communication system 618, and/or a WLAN communication system 620 (e.g., connectivity unit(s)). The satellite communication system 616, the cellular communication system 618, and/or the WLAN communication system 620 may be configured to transmit data to and/or receive data from the FMS backend 622 (or another device). In an example, the satellite communication system 616, the cellular communication system 618, and/or the WLAN communication system 620 may be configured to transmit an indication of the position fix 609 to the FMS backend 622. In another example, the satellite communication system 616, the cellular communication system 618, and/or the WLAN communication system 620 may be configured to transmit the sensor data 614 to the FMS backend 622.

In one example, the satellite communication system 616 may be configured to transmit the position fix 609 and/or the sensor data 614 to communication satellite(s) 624. The communication satellite(s) 624 may transmit, via the Internet 626 (or via other network(s)), the position fix 609 and/or the sensor data 614 to the FMS backend 622. In another example, the cellular communication system 618 (e.g., a 3G cellular communication system, a 4G cellular communication system, a 5G NR cellular communication system, etc.) may be configured to transmit the position fix 609 and/or the sensor data 614 to a network node 628. The network node 628 may be or include a base station (e.g., a gNB), a 4G base station, a 3G base station, etc. The network node 628 may transmit, via the Internet 626 (or via other network(s)), the position fix 609 and/or the sensor data 614 to the FMS backend 622. In yet another example, the WLAN communication system 620 may be configured to transmit the position fix 609 and/or the sensor data 614 to communication satellite(s) 624 to a WLAN AP 630. The WLAN AP 630 may transmit, via the Internet 626 (or via other network(s)), the position fix 609 and/or the sensor data 614 to the FMS backend 622. The communication satellite(s) 624, the network node 628, and/or the WLAN AP 630 may be referred to as wireless connectivity elements.

The FMS backend 622 may be or include a server. In an example, the FMS backend 622 may be or include a cloud server. In one aspect, the FMS backend may be included in the network node 628. Although not depicted in FIG. 6, the FMS backend may include processor(s), memory, data storage, communication system(s), etc. The FMS backend 622 may be configured to process and analyze the position fix 609, the sensor data 614, and/or other data. The FMS backend 622 may be configured to identify anomalies pertaining to the first IoT device 604 and/or the Mth IoT device 606 based on the (processed and analyzed) position fix 609, sensor data 614, and/or other data. The FMS backend 622 may be configured to update a location and health status of the first IoT device 604 and/or the Mth IoT device 606.

The first IoT device 604 may include a signal predictor 632 (e.g., a signal predictor module). As will be described in greater detail below, the signal predictor 632 may be configured to determine opportunistic time(s) for the first IoT device 604 to wake up to perform the position fix 609 and/or to report the position fix 609 and the sensor data 614 (e.g., health data) to the FMS backend 622.

In one aspect, the Mth IoT device 606 may include similar or identical system(s) and/or component(s) to those of the first IoT device 604. In another aspect, the Mth IoT device 606 may include different system(s) and/or component(s) compared to those of the first IoT device 604.

Figure 7:
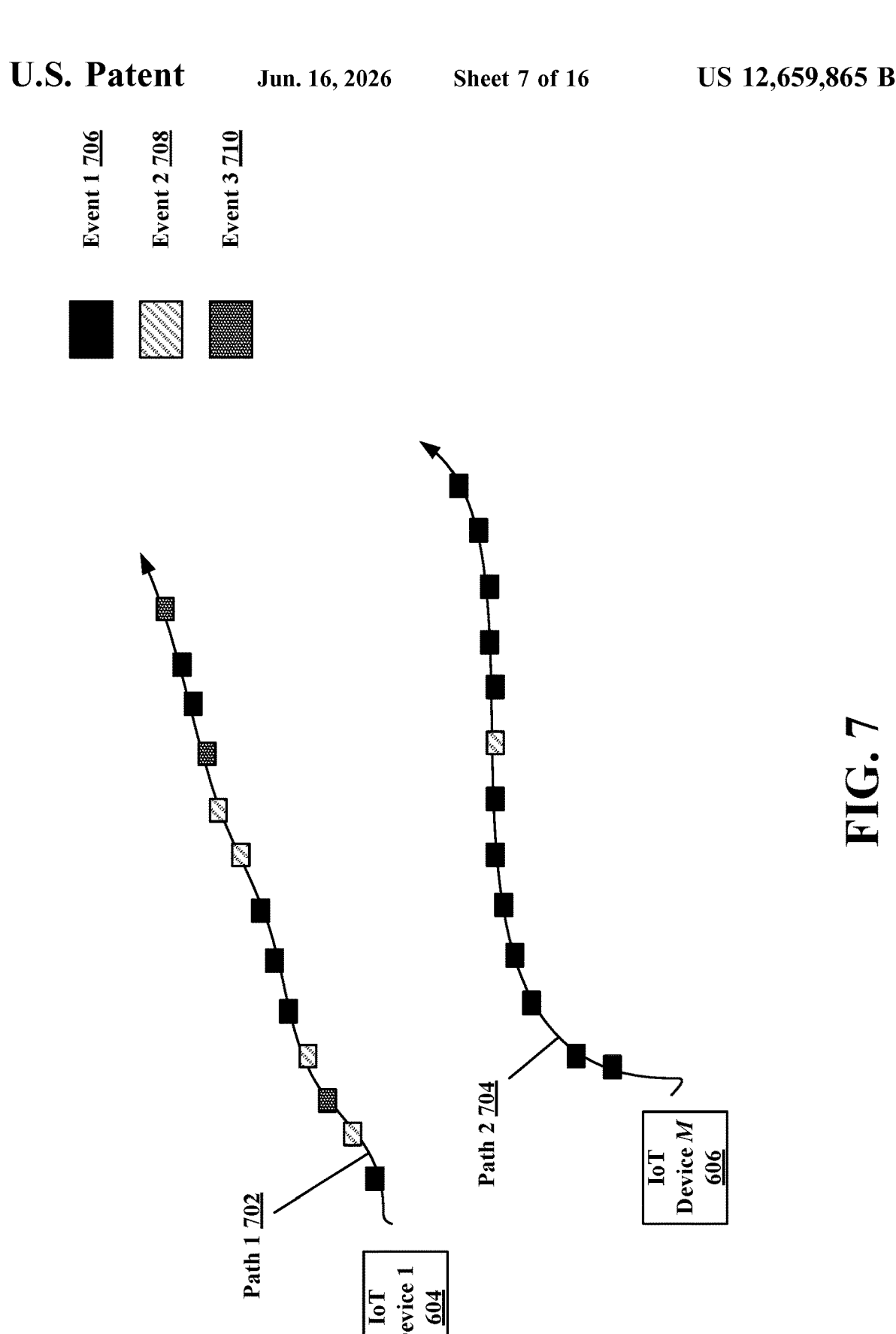
FIG. 7 is a diagram illustrating an example of a first path travelled by a first Internet of Things (IoT) device and a second path travelled by an Mth IoT device.

FIG. 7 is a diagram 700 illustrating an example of a first path 702 travelled by the first IoT device 604 and a second path 704 travelled by the Mth IoT device 606. In an example, the first IoT device 604 and the Mth IoT device 606 may be used to track and manage assets being transported across a geographical area (e.g., a country). For instance, the first IoT device 604 may be placed on a first vehicle travelling along the first path 702 and the Mth IoT device 606 may be placed on a second vehicle travelling along the second path 704. The first IoT device 604 and the Mth IoT device 606 may report signal traces along the first path 702 and the second path 704, respectively. In an example, the diagram 700 may be a view of the first path 702 and the second path 704 from the FMS backend 622.

As the first IoT device 604 and the Mth IoT device 606 travel along the first path 702 and the second path 704, respectively, the first IoT device 604 and the Mth IoT device 606 may undergo a first event 706, a second event 708, or a third event 710 at time instances (e.g., predetermined time intervals). The first event 706 may refer to a device (e.g., the first IoT device 604, the Mth IoT device 606) successfully performing a position fix (e.g., the position fix 609) and successfully uploading the position fix and sensor data (e.g., the sensor data 614) to the FMS backend 622 at a predetermined time interval. The second event 708 may refer to a device (e.g., the first IoT device 604, the Mth IoT device 606) successfully uploading sensor data (e.g., the sensor data 614) to the FMS backend 622 without the device successfully performing a position fix (e.g., the position fix 609) at a predetermined time interval. The third event 710 may refer to a device (e.g., the first IoT device 604, the Mth IoT device 606) missing a report (e.g., a report of the position fix 609 and/or a report of the sensor data 614) to the FMS backend 622 at a predetermined time interval due to no connectivity or poor connectivity with the FMS backend 622.

Figure 8:
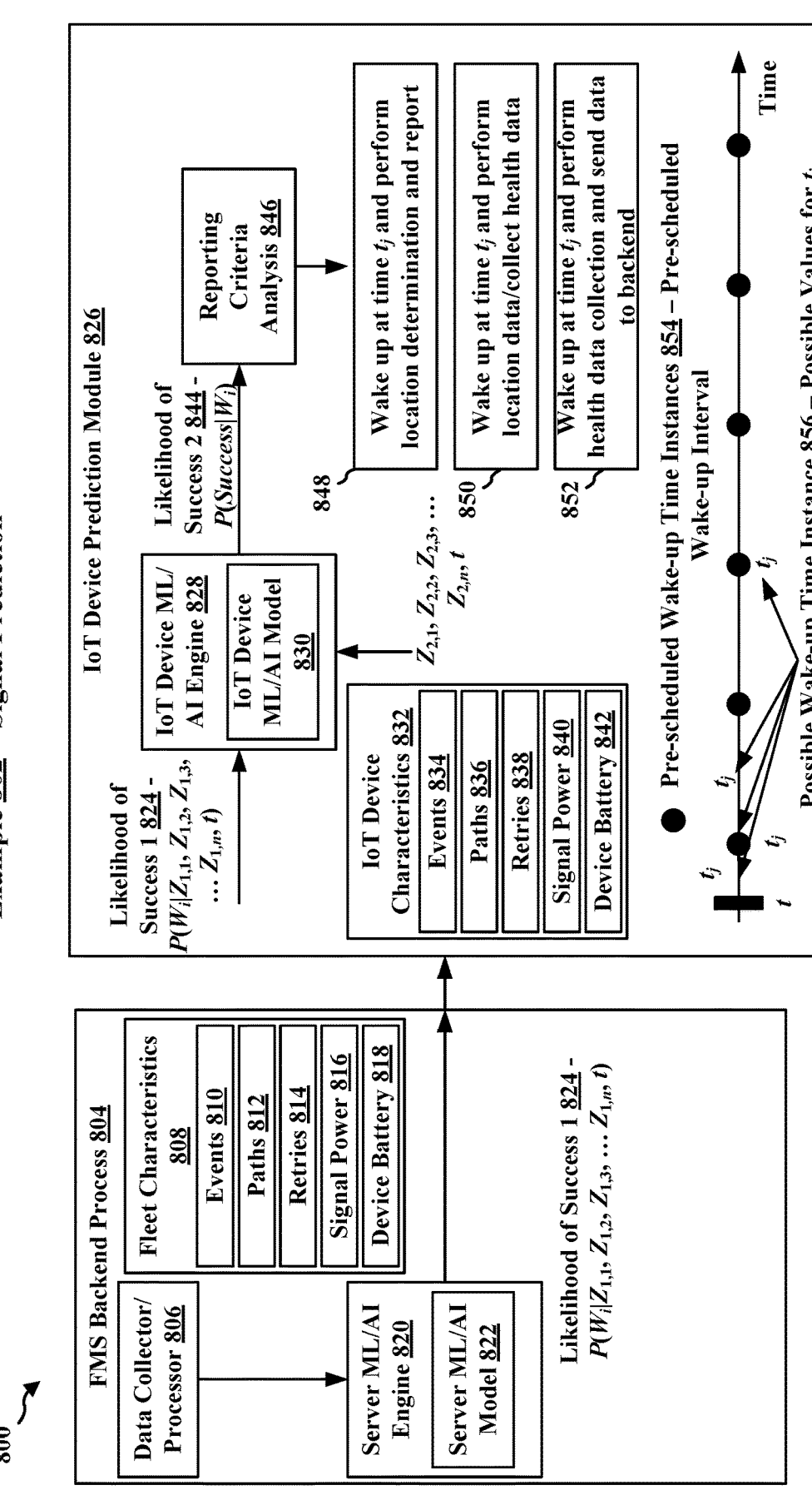
FIG. 8 is a diagram illustrating an example of aspects pertaining to signal prediction.

FIG. 8 is a diagram 800 illustrating an example 802 of aspects pertaining to signal prediction. The FMS backend 622 may perform an FMS backend process 804. During the FMS backend process 804, a data collector/processor 806 of the FMS backend 622 may collect and/or process fleet characteristics 808 of the fleet of IoT devices 604-606.

The fleet characteristics 808 may include indications of events 810 undergone by the fleet of IoT devices 604-606. In an example, the events 810 may be or include the first event 706 (which may be represented as $E_1$), the second event 708 (which may be represented as $E_2$), and/or the third event 710 (which may be represented as $E_3$). The indications of the events 810 may be time series data. The fleet characteristics 808 may include indications of paths 812 (e.g., the first path 702, the second path 704) travelled by the fleet of IoT devices 604-606. In an example, the indications of the paths 812 may be time series data of longitude and latitude coordinates. The fleet characteristics 808 may include indications of retries 814 of transmissions performed by the fleet of IoT devices 604-606. The fleet characteristics 808 may include indications of signal power 816 of the fleet of IoT devices 604-606. The indications of the signal power 816 may be time series data. In an example, the indications of the signal power 816 may include reference signal received power (RSRP) measurements or signal to interference and noise ratio (SINR) measurements. The fleet characteristics 808 may include indications of device battery 818 of the fleet of IoT devices 604-606. The indications of the device battery 818 may be time series data. In the diagram 800, the fleet characteristics 808 may be represented as $Z_1$, $Z_2$, $Z_3$, . . . , $Z_n$, t, where t represents time.

During the FMS backend process 804, the data collector/processor 806 may provide the fleet characteristics 808 to a server ML/AI engine 820 of the FMS backend 622. The server ML/AI engine 820 may be or include a server ML/AI model 822. Aspects pertaining to training/generating the server ML/AI model 822 will be discussed below. The server ML/AI model 822 may compute a first likelihood of success 824 (i.e., a first probability) of the first IoT device 604 successfully performing a position fix (e.g., the position fix 609) and/or successfully transmitting sensor data (e.g., the sensor data 614) based on the fleet characteristics 808. The first likelihood of success 824 may be represented by $P(W_i | Z_{1,1}, Z_{1,2}, Z_{1,3}, . . . , Z_{1,n}, t)$, where P represents a probability and where $W_i \in (E_1, E_2, E_3)$. Stated differently, based on prior knowledge from IoT devices that experienced conditions similar to those of the first IoT device 604, the server ML/AI model 822 may predict a likelihood (i.e., a probability) of a success of an event. The FMS backend 622 may transmit (e.g., via the Internet 626) an indication of the first likelihood of success 824 to the first IoT device 604.

The first IoT device 604 may receive the indication of the first likelihood of success 824 from the FMS backend. The first IoT device 604 may include an IoT device prediction module 826. The IoT device prediction module 826 may be or include the signal predictor 632.

The first IoT device 604 may obtain/generate/collect IoT device characteristics 832. The IoT device characteristics 832 may be similar to the fleet characteristics 808; however, the IoT device characteristics 832 may be specific to the first IoT device 604, whereas the fleet characteristics 808 may pertain to the fleet of IoT devices 604-606. The IoT device characteristics 832 may include indications of events 834 undergone by the first IoT device 604. In an example, the events 834 may be or include the first event 706 (which may be represented as $E_1$), the second event 708 (which may be represented as $E_2$), and/or the third event 710 (which may be represented as $E_3$). The indications of the events 834 may be time series data. The IoT device characteristics 832 may include indications of paths 836 (e.g., the first path 702) travelled by the first IoT device 604. In an example, the indications of the paths 836 may be time series data of longitude and latitude coordinates. The IoT device characteristics 832 may include indications of retries 838 of transmissions performed by the first IoT device 604. The IoT device characteristics 832 may include indications of signal power 840 of the first IoT device 604. The indications of the signal power 840 may be time series data. In an example, the indications of the signal power 840 may include RSRP measurements or SINR measurements. The IoT device characteristics 832 may include indications of device battery 842 of the first IoT device 604. The indications of the device battery 842 may be time series data. The IoT device characteristics 832 may be represented by $(Z_{2,1}, Z_{2,2}, Z_{2,3}, . . . , Z_{2,n}, t)$.

The IoT device prediction module 826 may include an IoT device ML/AI engine 828. The IoT device ML/AI engine 828 may be referred to as a local IoT device ML/AI engine 828. The IoT device ML/AI engine 828 may be or include an IoT device ML/AI model 830. Aspects pertaining to training/generating the IoT device ML/AI model 830 will be discussed below. The IoT device ML/AI model 830 may compute a second likelihood of success 844 (i.e., a second probability) of the first IoT device 604 successfully performing a position fix (e.g., the position fix 609) and/or successfully transmitting sensor data (e.g., the sensor data 614) based on the first likelihood of success 824 and the IoT device characteristics 832. The second likelihood of success 844 may be represented by $P(Success | W_i)$. Stated differently, based on prior knowledge from IoT devices that experienced conditions similar to those of the first IoT device 604 and based on current conditions of the first IoT device 604, the IoT device ML/AI model 830 may predict a likelihood (i.e., a probability) of the first IoT device 604 successfully performing a position fix (e.g., the position fix 609) and/or successfully transmitting the sensor data 614.

The IoT device prediction module 826 of the first IoT device 604 may perform a reporting criteria analysis 846 based on the second likelihood of success 844 in order to determine a course of action to take that conserves battery life of the first IoT device 604 while meeting reporting criteria. In one example, at 848, based on the reporting criteria analysis 846, the first IoT device 604 may determine that the first IoT device 604 is to wake up at time $t_j$ and report a position fix (e.g., the position fix 609) and/or transmit sensor data (e.g., the sensor data 614) to the FMS backend 622. In another example, at 850, based on the reporting criteria analysis 846, the first IoT device 604 may determine that the first IoT device 604 is to wake up at time $t_j$ and perform the position fix (e.g., the position fix 609) and collect sensor data (e.g., the sensor data 614) without transmitting an indication of the position fix and/or the sensor data to the FMS backend 622 (e.g., due to predicted interference of a communication channel between the first IoT device 604 and the FMS backend 622). In a further example, at 852, based on the reporting criteria analysis 846, the first IoT device 604 may determine that the first IoT device 604 is to wake up at time $t_j$, perform health data collection (e.g., collect the sensor data 614) and transmit the sensor data to the FMS backend 622 without performing a position fix (e.g., the position fix 609) due to poor coverage for location determination.

The first IoT device 604 may determine when to sleep and wake up at opportunistic times in order to perform proper functions while meeting the reporting criteria. In an example, the first IoT device 604 may be configured by the FMS backend 622 with pre-scheduled wakeup time instances 854 (i.e., a pre-scheduled wakeup time instance).

The pre-scheduled wakeup time instances 854 are represented in the diagram 800 as circles. The first IoT device 604 may determine a possible wake-up time instance 856 (i.e., possible values for time ti) based on the second likelihood of success 844 and/or the reporting criteria analysis 846. In an example, the possible wake-up time instance 856 may be a wakeup time instance that is different from the pre-scheduled wakeup time instance in the pre-scheduled wakeup time instances 854. For instance, the possible wake-up time instance 856 may occur before or after a next-scheduled pre-scheduled wakeup time instance in the pre-scheduled wakeup time instances 854. In another example, the possible wake-up time instance 856 may be a next-scheduled pre-scheduled wakeup time instance in the pre-scheduled wakeup time instances 854. In a further example, possible wake-up time instance 856 may be a pre-scheduled wakeup time instance in the pre-scheduled wakeup time instances 854 that occurs after a next-scheduled pre-scheduled wakeup time instance in the pre-scheduled wakeup time instances 854. A wake-up time instance may refer to a time instance at which a device (e.g., an IoT device) transitions from a low power sleep mode to an active mode in which the device is able to perform a position fix and/or transmit sensor data. A sleep time instance may refer to a time instance at which a device (e.g., an IoT device) transitions from an active mode to a low power sleep mode. The low power sleep mode may consume less battery power of the device compared to battery power consumed when the device is in the active mode.

Although the first IoT device 604 has been described above as opportunistically sleeping and waking up to report a position fix and/or transmit data, other possibilities are contemplated. In one aspect, using the technologies described above, instead of waking up and reporting at a wake-up time instance, the first IoT device 604 may enter into a standby mode (e.g., at a standby time instance) and the first IoT device 604 may wake up to report a position fix and/or transmit data at the wake-up time instance. In another aspect, using the technologies described above, instead of going to sleep, the first IoT device 604 may place itself in a standby mode (e.g., at a standby time instance) and the first IoT device 604 may go to sleep at a later time instance (e.g., at a sleep time instance).

Figure 9:
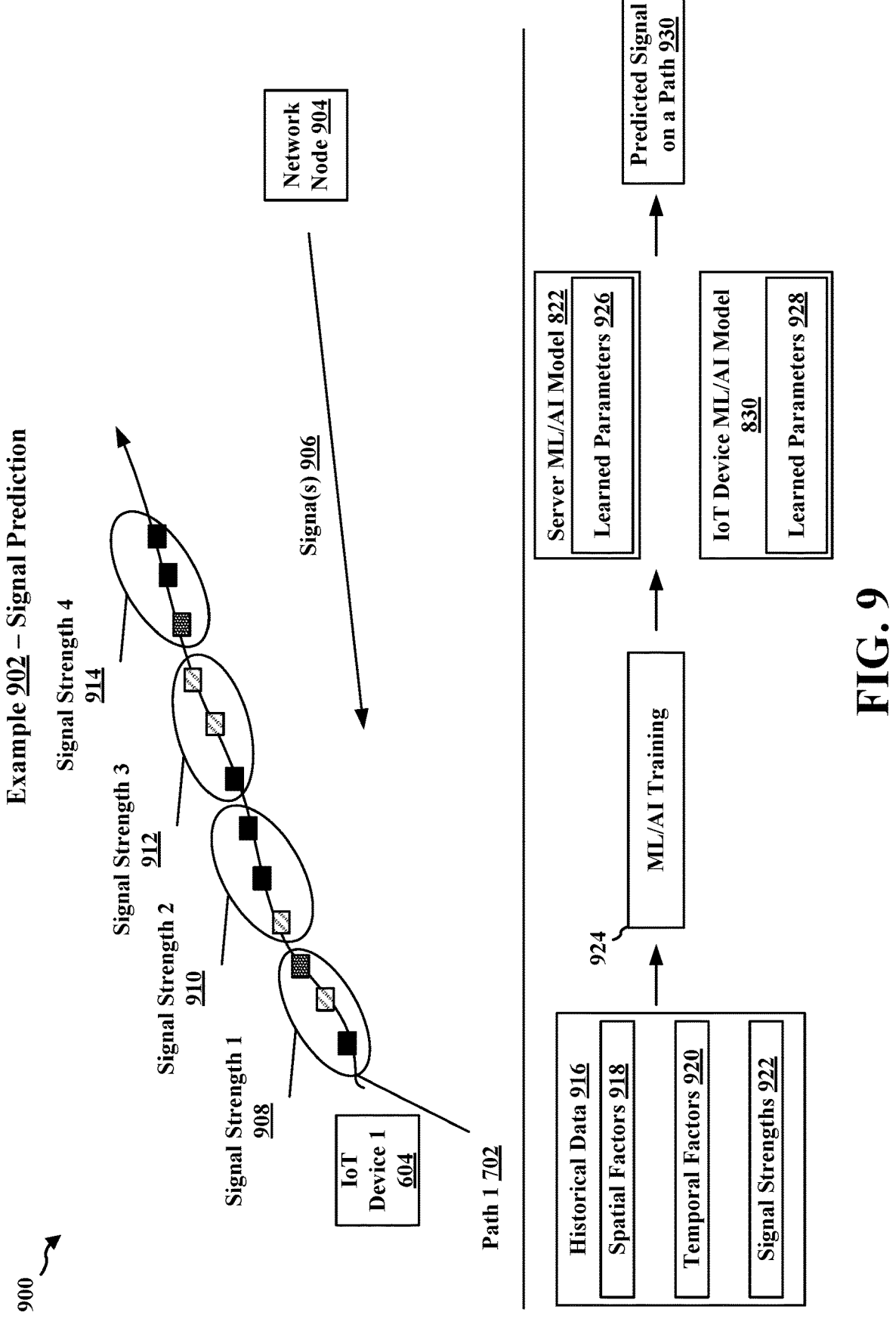
FIG. 9 is a diagram illustrating an example of aspects pertaining to signal prediction.

FIG. 9 is a diagram 900 illustrating an example 902 of aspects pertaining to signal prediction. The example 902 may pertain to the server ML/AI model 822 of the server ML/AI engine 820 and/or the example 902 may pertain to the IoT device ML/AI model 830 of the IoT device ML/AI engine 828.

The example 902 may pertain to spatio-temporal data training and forecasting. Wireless connectivity on routes (i.e., paths) may include spatial variations and temporal variations. Spatial variations may be based on stationary factors, such as a distance of an IoT device to a signal source (e.g., a network node) and/or attenuating/interfering structures near the IoT device and/or the signal source. Temporal variations may be based on time-dependent factors such as weather and/or temporary attenuating/interfering situations (e.g., heavy cellular network traffic due to a large number of users using UEs). Data may be collected by measuring wireless connectivity signals (e.g., RSRP measurements with respect to the wireless connectivity signals, SINR measurements with respect to the wireless connectivity signals, etc.) on a route (i.e., a path). An ML/AI engine (e.g., the server ML/AI model 822 of the server ML/AI engine 820 and/or the IoT device ML/AI model 830 of the IoT device ML/AI engine 828) may be trained on spatial factors (corresponding to the spatial variations) and temporal factors (corresponding to the temporal variations) separately or combined depending on trade-offs between accuracy and complexity. Stated differently, the server ML/AI model 822 and/or the IoT device ML/AI model 830 may be trained based on spatial factors and/or temporal factors. The trained ML/AI engine may be configured to forecast a signal on a route (i.e., a path) in order to optimize a wakeup and reporting schedule.

In an example, a network node 904 (e.g., a base station) may transmit signal(s) 906 (e.g., reference signals) as the first IoT device 604 travels along the first path 702. The first IoT device 604 may measure signal strengths of the signal(s) 906 as the first IoT device 604 travels along the first path 702. For instance, during a first time period/time instance, the first IoT device 604 may measure a first signal strength 908 of the signal(s) 906, during a second time period/time instance, the first IoT device 604 may measure a second signal strength 910 of the signal(s) 906, during a third time period/time instance, the first IoT device 604 may measure a third signal strength 912 of the signal(s) 906, and during a fourth time period/time instance, the first IoT device 604 may measure a fourth signal strength 914 of the signal(s) 906.

A device (e.g., the FMS backend 622) may accumulate historical data 916 in order to train an ML/AI engine (e.g., the server ML/AI model 822 of the server ML/AI engine 820 and/or the IoT device ML/AI model 830 of the IoT device ML/AI engine 828). The historical data 916 may include spatial factors 918 and/or temporal factors 920. The spatial factors 918 may include stationary factors, such as a distance of an IoT device to a signal source (e.g., a network node) and/or attenuating/interfering structures (e.g., buildings) near the IoT device and/or the signal source. The temporal factors 920 may include time-dependent factors such as weather and/or temporary attenuating/interfering situations (e.g., heavy cellular network traffic due to a large number of users using UEs). In one aspect, the temporal factors 920 (i.e., temporal variation) may be forecasted via deep learning. The historical data 916 may also include signal strengths 922. The signal strengths 922 may include the first signal strength 908, the second signal strength 910, the third signal strength 912, and the fourth signal strength 914. The device may perform ML/AI training 924 based on the historical data. In an example, based on the ML/AI training 924, the device may obtain/generate the server ML/AI model 822. The server ML/AI model 822 may include learned parameters 926, where the learned parameters 926 may be based on or influenced by the historical data 916. In an example, the learned parameters 926 may be weights. In another example, based on the ML/AI training 924, the device may obtain/generate the IoT device ML/AI model 830. The IoT device ML/AI model 830 may include learned parameters 928, where the learned parameters 928 may be based on or influenced by the historical data 916. In an example, the learned parameters 928 may be weights. In an example, the learned parameters 926 may be different from the learned parameters 928 (e.g., different weights). In one aspect, the server ML/AI model 822 and/or the IoT device ML/AI model 830 may be configured to output a predicted signal on a path 930 based on (1) the learned parameters 926 or the learned parameters 928, respectively and (2) input data. In an example, the input data to the server ML/AI model 822 may be or include the fleet characteristics 808. In an example, the input data to the IoT device ML/AI model 830 may be or include the first likelihood of success 824 and the IoT device characteristics 832. In one aspect, the device may train a lightweight ML/AI engine on spatial variation (i.e., spatial factors) and not temporal factors, where the lightweight ML/AI engine may forecast signal strengths for a trip (i.e., a path) in advance.

The server ML/AI model 822 and/or the IoT device ML/AI model 830 may be or include artificial neural networks (ANN); decision tree learning; convolutional neural networks (CNNs); deep learning architectures (e.g., deep learning models) in which an output of a first layer of neurons becomes an input to a second layer of neurons, and so forth; support vector machines (SVM), e.g., including a separating hyperplane (e.g., decision boundary) that categorizes data; regression analysis; Bayesian networks; genetic algorithms; deep convolutional networks (DCNs) configured with additional pooling and normalization layers; and deep belief networks (DBNs). The server ML/AI model 822 and/or the IoT device ML/AI model 830 may be or include a long-short term memory (LSTM) based model (e.g., an LSTM model with fifty hidden states and two layers) or a transformer model.

A machine learning model (e.g., server ML/AI model 822 and/or the IoT device ML/AI model 830), such as an artificial neural network (ANN), may include an interconnected group of artificial neurons (e.g., neuron models), and may be a computational device or may represent a method to be performed by a computational device. The connections of the neuron models may be modeled as weights. Machine learning models may provide predictive modeling, adaptive control, and other applications through training via a dataset. The model may be adaptive based on external or internal information that is processed by the machine learning model. Machine learning may provide non-linear statistical data model or decision making and may model complex relationships between input data and output information.

A machine learning model (e.g., server ML/AI model 822 and/or the IoT device ML/AI model 830) may include multiple layers and/or operations that may be formed by concatenation of one or more of the referenced operations. Examples of operations that may be involved include extraction of various features of data, convolution operations, fully connected operations that may be activated or deactivated, compression, decompression, quantization, flattening, etc. A "layer" of a machine learning model may be used to denote an operation on input data. For example, a convolution layer, a fully connected layer, and/or the like may be used to refer to associated operations on data that is input into a layer. A convolution A×B operation refers to an operation that converts a number of input features A into a number of output features B. "Kernel size" may refer to a number of adjacent coefficients that are combined in a dimension. A "weight" may be used to denote one or more coefficients used in the operations in the layers for combining various rows and/or columns of input data. For example, a fully connected layer operation may have an output y that is determined based at least in part on a sum of a product of input matrix x and weights A (which may be a matrix) and bias values B (which may be a matrix). The term "weights" may be used herein to generically refer to both weights and bias values. Weights and biases are examples of parameters of a trained machine learning model. Different layers of a machine learning model (e.g., server ML/AI model 822 and/or the IoT device ML/AI model 830) may be trained separately.

Machine learning models (e.g., server ML/AI model 822 and/or the IoT device ML/AI model 830) may include a variety of connectivity patterns, e.g., including any of feed-forward networks, hierarchical layers, recurrent architectures, feedback connections, etc. The connections between layers of a neural network may be fully connected or locally connected. In a fully connected network, a neuron in a first layer may communicate its output to each neuron in a second layer, and each neuron in the second layer may receive input from every neuron in the first layer. In a locally connected network, a neuron in a first layer may be connected to a limited number of neurons in the second layer. In some aspects, a convolutional network may be locally connected and configured with shared connection strengths associated with the inputs for each neuron in the second layer. A locally connected layer of a network may be configured such that each neuron in a layer has the same, or similar, connectivity pattern, but with different connection strengths.

A machine learning model (e.g., server ML/AI model 822 and/or the IoT device ML/AI model 830) or neural network may be trained. For example, a machine learning model may be trained based on supervised learning. During training, the machine learning model may be presented with an input that the model uses to compute to produce an output. The actual output may be compared to a target output, and the difference may be used to adjust parameters (such as weights and biases) of the machine learning model in order to provide an output closer to the target output. Before training, the output may be incorrect or less accurate, and an error, or difference, may be calculated between the actual output and the target output. The weights of the machine learning model may then be adjusted so that the output is more closely aligned with the target. To adjust the weights, a learning algorithm may compute a gradient vector for the weights. The gradient may indicate an amount that an error would increase or decrease if the weight were adjusted slightly. At the top layer, the gradient may correspond directly to the value of a weight connecting an activated neuron in the penultimate layer and a neuron in the output layer. In lower layers, the gradient may depend on the value of the weights and on the computed error gradients of the higher layers. The weights may then be adjusted so as to reduce the error or to move the output closer to the target. This manner of adjusting the weights may be referred to as back propagation through the neural network. The process may continue until an achievable error rate stops decreasing or until the error rate has reached a target level.

The above-described technologies may be associated with various advantages. First, the above-described technologies may leverage historical data in order to facilitate an IoT device (e.g., the first IoT device 604) to make better and smarter decisions pertaining to waking up to perform position fixes and/or to report sensor data. Second, the above-described technologies may enable an IoT device to wake up at an opportunistic time in order to determine position/location information and to send data to an FMS backend. Third, as ML/AI engines may run on both an FMS backend and on an IoT device, the backend may leverage the historical data and the IoT device may utilize an output of the backend ML/AI engine and data pertaining to a current situation of the IoT device in order to determine a next action to take. The split of the ML/AI engine between the FMS backend and the IoT device may allow for quick adaptation of the IoT device to changing reporting criteria and/or to changing conditions of the IoT device. Furthermore, using the above-described technologies, the IoT device may wake up at a time instance that is different from a preconfigured time instance (e.g., a pre-scheduled interval), as the preconfigured time instance may not be suitable due to an environment around the device. In an example, the time instance may occur prior to (i.e., earlier than) the preconfigured time instance. In another example, the IoT device may skip several preconfigured time instances (e.g., skip several pre-scheduled intervals) before waking up based on a likelihood of success in terms of actions that are to be taken by the IoT device. Additionally, the above-described technologies may save battery power on an IoT device and may increase an efficiency of reporting position fixes and/or sensor data.

Figure 10:
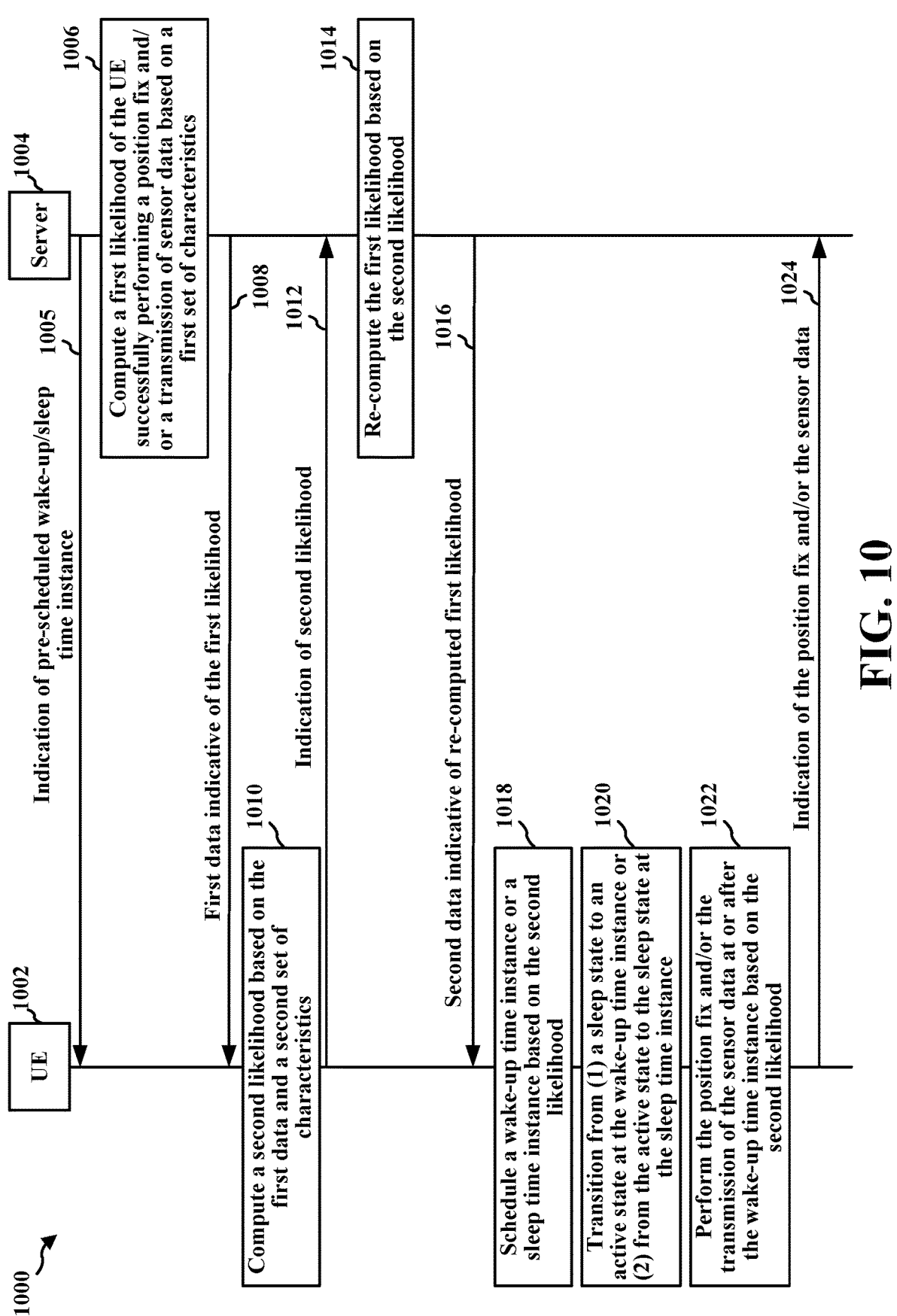
FIG. 10 is a diagram illustrating example communications between a UE and a server.

FIG. 10 is a diagram 1000 illustrating example communications between a UE 1002 and a server 1004. In an example, the UE 1002 may be or include the UE 104, the UE 350, the UE 404, the first IoT device 604, the apparatus 1504, etc. In an example, the server 1004 may be the FMS backend 622. In an example, the server 1004 may be included in the base station 102, the base station 310, the network entity 1502, the network entity 1602, etc.

At 1008, the UE 1002 may receive, from the server 1004, first data that is indicative of a first likelihood of the UE 1002 successfully performing at least one of a position fix or a transmission of sensor data based on a first set of characteristics associated with the UE 1002 and at least one additional UE. At 1010, the UE 1002 may compute, based on the first data and a second set of characteristics associated with the UE 1002, a second likelihood of the UE 1002 successfully performing at least one of the position fix or the transmission of the sensor data. At 1018, the UE 1002 may schedule, based on the second likelihood, a wake-up time instance or a sleep time instance. At 1020, the UE 1002 may transition the UE 1002 (1) from a sleep state to an active state at the wake-up time instance or (2) from the active state to the sleep state at the sleep time instance.

At 1012, the UE 1002 may transmit, to the server 1004, an indication of the second likelihood of the UE 1002 successfully performing at least one of the position fix or the transmission of the sensor data. At 1016, the UE 1002 may receive, from the server 1004 based on the second likelihood, second data that is indicative of a re-computed first likelihood of the UE 1002 successfully performing at least one of the position fix or the transmission of the sensor data. At 1022, the UE 1002 may perform, based on the second likelihood, at least one of the position fix or the transmission of the sensor data at or after the wake-up time instance. At 1005, the UE 1002 may receive, from the server 1004, an indication of a pre-scheduled wake-up time instance or a pre-scheduled sleep time instance, where the wake-up time instance or the sleep time instance differ from the pre-scheduled wake-up time instance or the pre-scheduled sleep time instance, respectively. At 1024, the UE 1002 may transmit, to the server 1004, an indication of at least one of the position fix or the transmission of the sensor data.

At 1006, the server 1004 may compute a first likelihood of the UE 1002 successfully performing at least one of a position fix or a transmission of sensor data based on a first set of characteristics associated with the UE 1002 and at least one additional UE. At 1008, the server 1004 may transmit, to the UE 1002, first data that is indicative of the first likelihood of the UE 1002 successfully performing at least one of the position fix or the transmission of the sensor data. At 1012, the server 1004 may receive, from the UE 1002, an indication of a second likelihood of the UE 1002 successfully performing at least one of the position fix or the transmission of the sensor data.

At 1014, the server 1004 may re-compute, based on second likelihood, the first likelihood of the UE 1002 successfully performing at least one of the position fix or the transmission of the sensor data. At 1016, the server 1004 may transmit, to the UE 1002, second data that is indicative of the re-computed first likelihood of the UE 1002 successfully performing at least one of the position fix or the transmission of the sensor data. At 1024, the server 1004 may receive, from the UE 1002, an indication of at least one of the position fix or the transmission of the sensor data. At 1005, the server 1004 may transmit, to the UE 1002, an indication of a pre-scheduled wake-up time instance or a pre-scheduled sleep time instance, where the indication of at least one of the position fix or the transmission of the sensor data is associated with a time instance that is different from the pre-scheduled wake-up time instance or the pre-scheduled sleep time instance.

FIG. 11 is a flowchart 1100 of a method of wireless communication. The method may be performed by a UE (e.g., the UE 104, the UE 350, the UE 404, the first IoT device 604, the UE 1002, the apparatus 1504). The method may be associated with various advantage at the UE, such as reducing battery consumption of the UE via opportunistic wakeup. In an example, the method may be performed by the asset tracking and monitoring component 198.

At 1102, the UE receives, from a server, first data that is indicative of a first likelihood of the UE successfully performing at least one of a position fix or a transmission of sensor data based on a first set of characteristics associated with the UE and at least one additional UE. For example, FIG. 10 at 1008 shows that the UE 1002 may receive, from a server 1004, first data that is indicative of a first likelihood of the UE 1002 successfully performing at least one of a position fix or a transmission of sensor data based on a first set of characteristics associated with the UE 1002 and at least one additional UE. In an example, the first data may be/include/be associated with the first likelihood of success 824. In an example, the position fix may be or include the position fix 609 and the sensor data may be or include the sensor data 614. In an example, the first set of characteristics may be the fleet characteristics 808. In an example, the UE may be the first IoT device 604 and the at least one additional UE may be the Mth IoT device 606. In an example, the server may be or include the FMS backend 622. In an example, 1102 may be performed by the asset tracking and monitoring component 198.

At 1104, the UE computes, based on the first data and a second set of characteristics associated with the UE, a second likelihood of the UE successfully performing at least one of the position fix or the transmission of the sensor data. For example, FIG. 10 at 1010 shows that the UE 1002 may compute, based on the first data and a second set of characteristics associated with the UE 1002, a second likelihood of the UE 1002 successfully performing at least one of the position fix or the transmission of the sensor data. In an example, the second set of characteristics may be or include the IoT device characteristics 832. In an example, the second likelihood may be or include the second likelihood of success 844. In an example, 1104 may be performed by the asset tracking and monitoring component 198.

At 1106, the UE schedules, based on the second likelihood, a wake-up time instance or a sleep time instance. For example, FIG. 10 at 1018 shows that the UE 1002 may schedule, based on the second likelihood, a wake-up time instance or a sleep time instance. In an example, the wake-up time instance or the sleep time instance may correspond to the possible wake-up time instance 856. In an example, 1106 may be performed by the asset tracking and monitoring component 198.

At 1108, the UE transitions the UE (1) from a sleep state to an active state at the wake-up time instance or (2) from the active state to the sleep state at the sleep time instance. For example, FIG. 10 at 1020 shows that the UE 1002 may transition the UE 1002 (1) from a sleep state to an active state at the wake-up time instance or (2) from the active state to the sleep state at the sleep time instance. In an example, 1108 may be performed by the asset tracking and monitoring component 198.

Figure 12:
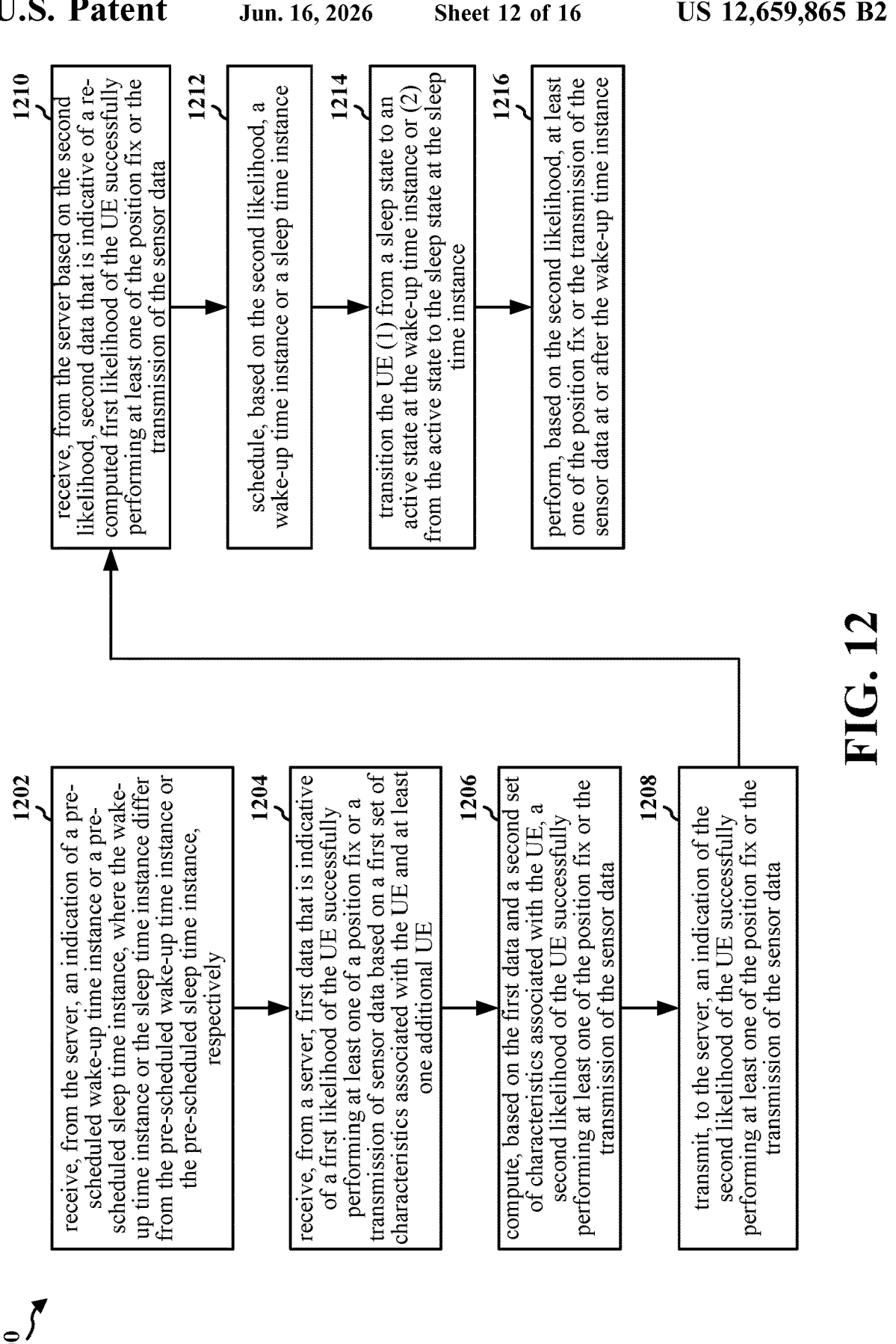
FIG. 12 is a flowchart of a method of wireless communication.

FIG. 12 is a flowchart 1200 of a method of wireless communication. The method may be performed by a UE (e.g., the UE 104, the UE 350, the UE 404, the first IoT device 604, the UE 1002, the apparatus 1504). The method may be associated with various advantage at the UE, such as reducing battery consumption of the UE via opportunistic wakeup. In an example, the method (including the various aspects detailed below) may be performed by the asset tracking and monitoring component 198.

At 1204, the UE receives, from a server, first data that is indicative of a first likelihood of the UE successfully performing at least one of a position fix or a transmission of sensor data based on a first set of characteristics associated with the UE and at least one additional UE. For example, FIG. 10 at 1008 shows that the UE 1002 may receive, from a server 1004, first data that is indicative of a first likelihood of the UE 1002 successfully performing at least one of a position fix or a transmission of sensor data based on a first set of characteristics associated with the UE 1002 and at least one additional UE. In an example, the first data may be/include/be associated with the first likelihood of success 824. In an example, the position fix may be or include the position fix 609 and the sensor data may be or include the sensor data 614. In an example, the first set of characteristics may be the fleet characteristics 808. In an example, the UE may be the first IoT device 604 and the at least one additional UE may be the Mth IoT device 606. In an example, the server may be or include the FMS backend 622. In an example, 1204 may be performed by the asset tracking and monitoring component 198.

At 1206, the UE computes, based on the first data and a second set of characteristics associated with the UE, a second likelihood of the UE successfully performing at least one of the position fix or the transmission of the sensor data. For example, FIG. 10 at 1010 shows that the UE 1002 may compute, based on the first data and a second set of characteristics associated with the UE 1002, a second likelihood of the UE 1002 successfully performing at least one of the position fix or the transmission of the sensor data. In an example, the second set of characteristics may be or include the IoT device characteristics 832. In an example, the second likelihood may be or include the second likelihood of success 844. In an example, 1206 may be performed by the asset tracking and monitoring component 198.

At 1212, the UE schedules, based on the second likelihood, a wake-up time instance or a sleep time instance. For example, FIG. 10 at 1018 shows that the UE 1002 may schedule, based on the second likelihood, a wake-up time instance or a sleep time instance. In an example, the wake-up time instance or the sleep time instance may correspond to the possible wake-up time instance 856. In an example, 1212 may be performed by the asset tracking and monitoring component 198.

At 1214, the UE transitions the UE (1) from a sleep state to an active state at the wake-up time instance or (2) from the active state to the sleep state at the sleep time instance. For example, FIG. 10 at 1020 shows that the UE 1002 may transition the UE 1002 (1) from a sleep state to an active state at the wake-up time instance or (2) from the active state to the sleep state at the sleep time instance. In an example, 1214 may be performed by the asset tracking and monitoring component 198.

In one aspect, at 1208, the UE may transmit, to the server, an indication of the second likelihood of the UE successfully performing at least one of the position fix or the transmission of the sensor data. For example, FIG. 10 at 1012 shows that the UE 1002 may transmit, to the server 1004, an indication of the second likelihood of the UE 1002 successfully performing at least one of the position fix or the transmission of the sensor data. In an example, 1208 may be performed by the asset tracking and monitoring component 198.

In one aspect, at 1210, the UE may receive, from the server based on the second likelihood, second data that is indicative of a re-computed first likelihood of the UE successfully performing at least one of the position fix or the transmission of the sensor data. For example, FIG. 10 at 1016 shows that the UE 1002 may receive, from the server 1004 based on the second likelihood, second data that is indicative of a re-computed first likelihood of the UE 1002 successfully performing at least one of the position fix or the transmission of the sensor data. In an example, 1210 may be performed by the asset tracking and monitoring component 198.

In one aspect, at 1216, the UE may perform, based on the second likelihood, at least one of the position fix or the transmission of the sensor data at or after the wake-up time instance. For example, FIG. 10 at 1022 shows that the UE 1002 may perform, based on the second likelihood, at least one of the position fix or the transmission of the sensor data at or after the wake-up time instance. In an example, 1216 may be performed by the asset tracking and monitoring component 198.

In one aspect, performing at least one of the position fix or the transmission of the sensor data may include transmitting, to the server via a least one of a satellite link, a cellular link, or a wireless local area network (WLAN) link, an indication of at least one of the position fix or the sensor data. For example, performing at least one of the position fix or the transmission of the sensor data at 1022 may include transmitting, to the server 1004 via a least one of a satellite link, a cellular link, or a wireless local area network (WLAN) link, an indication of at least one of the position fix or the sensor data. In an example, the satellite link may be associated with the communication satellite(s) 624, the cellular link may be associated with the network node 628, and the WLAN link may be associated with the WLAN AP 630.

In one aspect, at 1202, the UE may receive, from the server, an indication of a pre-scheduled wake-up time instance or a pre-scheduled sleep time instance, where the wake-up time instance or the sleep time instance may differ from the pre-scheduled wake-up time instance or the pre-scheduled sleep time instance, respectively. For example, FIG. 10 at 1005 shows that the UE 1002 may receive, from the server 1004, an indication of a pre-scheduled wake-up time instance or a pre-scheduled sleep time instance, where the wake-up time instance or the sleep time instance may differ from the pre-scheduled wake-up time instance or the pre-scheduled sleep time instance, respectively. In an example, 1202 may be performed by the asset tracking and monitoring component 198

In one aspect, the UE may include an Internet of things (IoT) device that belongs to a fleet of IoT devices and the server may include a fleet management server. For example, the UE may be or the first IoT device 604, the fleet of IoT devices may be or include the fleet of IoT devices 604-606, and the fleet management server may be or include the FMS backend 622.

In one aspect, the first set of characteristics may include at least one of a battery life of the UE and the at least one additional UE, a path of the UE and the at least one additional UE, a number of permitted retransmissions associated with the UE and the at least one additional UE, or a signal strength associated with the UE and the at least one additional UE. For example, the aforementioned aspect may correspond to the events 810, the paths 812, the retries 814, the signal power 816, and/or the device battery 818.

In one aspect, the second set of characteristics may include at least one of a battery life of the UE, a path of the UE, a number of permitted retransmissions associated with the UE, or a signal strength associated with the UE. For example, the aforementioned aspect may correspond to the paths 836, the retries 838, the signal power 840, and/or the device battery 842.

In one aspect, the sensor data may include at least one of a camera image, a video stream, a temperature measurement, a speed of the UE, or an indication of a battery life of the UE. For example, the sensor data 614 may include at least one of a camera image, a video stream, a temperature measurement, a speed of the UE, or an indication of a battery life of the UE.

In one aspect, the first data may be associated with a first machine learning (ML) model of the server, and computing the second likelihood of the UE successfully performing at least one of the position fix or the transmission of the sensor data may include computing the second likelihood by way of a second ML model of the UE. For example, the first ML model of the server may be or include the server ML/AI engine 820 and/or the server ML/AI model 822. In an example, computing the second likelihood of the UE 1002 successfully performing at least one of the position fix or the transmission of the sensor data at 1010 may include computing the second likelihood by way of a second ML model of the UE. In an example, the second ML model of the UE may be or include the IoT device ML/AI engine 828 and/or the IoT device ML/AI model 830.

In one aspect, at least one of the first ML model or the second ML model may be trained based on at least one of spatial factors between the UE and the server or temporal factors between the UE and the server. For example, the aforementioned aspect may correspond to the spatial factors 918 and/or the temporal factors 920. In an example, the aforementioned aspect may correspond to the ML/AI training 924 in FIG. 9.

In one aspect, the spatial factors may include at least one of a distance of the UE to the server or one or more structures that exist between the UE and the server and the temporal factors may include at least one of weather in an environment associated with the UE or temporary interference sources in the environment. For example, the spatial factors 918 may include at least one of a distance of the UE to the server or one or more structures that exist between the UE and the server and the temporal factors 920 may include at least one of weather in an environment associated with the UE or temporary interference sources in the environment.

FIG. 13 is a flowchart 1300 of a method of wireless communication. The method may be performed by a server (e.g., the FMS backend 622, the server 1004) or a base station (e.g., the base station 102, the base station 310, the network node 904, the network entity 1502, the network entity 1602). The method may be associated with various advantages at the server, such as facilitating management of IoT devices. In an example, the method may be performed by the asset tracking and monitoring component 199.

At 1302, the server computes a first likelihood of a user equipment (UE) successfully performing at least one of a position fix or a transmission of sensor data based on a first set of characteristics associated with the UE and at least one additional UE. For example, FIG. 10 at 1006 shows that the server 1004 may compute a first likelihood of a UE 1002 successfully performing at least one of a position fix or a transmission of sensor data based on a first set of characteristics associated with the UE 1002 and at least one additional UE. In an example, the first likelihood may be the first likelihood of success 824. In an example, the position fix may be or include the position fix 609 and the sensor data may be or include the sensor data 614. In an example, the first set of characteristics may be or include the fleet characteristics 808. In an example, the UE may be the first IoT device 604 and the at least one additional UE may be the Mth IoT device 606. In an example, 1302 may be performed by the asset tracking and monitoring component 199.

At 1304, the server transmits, to the UE, first data that is indicative of the first likelihood of the UE successfully performing at least one of the position fix or the transmission of the sensor data. For example, FIG. 10 at 1008 shows that the server 1004 may transmit, to the UE 1002, first data that is indicative of the first likelihood of the UE 1002 successfully performing at least one of the position fix or the transmission of the sensor data. In an example, 1304 may be performed by the asset tracking and monitoring component 199.

At 1306, the server receives, from the UE, an indication of a second likelihood of the UE successfully performing at least one of the position fix or the transmission of the sensor data. For example, FIG. 10 at 1012 shows that the server 1004 may receive, from the UE 1002, an indication of a second likelihood of the UE 1002 successfully performing at least one of the position fix or the transmission of the sensor data. In an example, the second likelihood may be or include the second likelihood of success 844. In an example, 1306 may be performed by the asset tracking and monitoring component 199.

Figure 14:
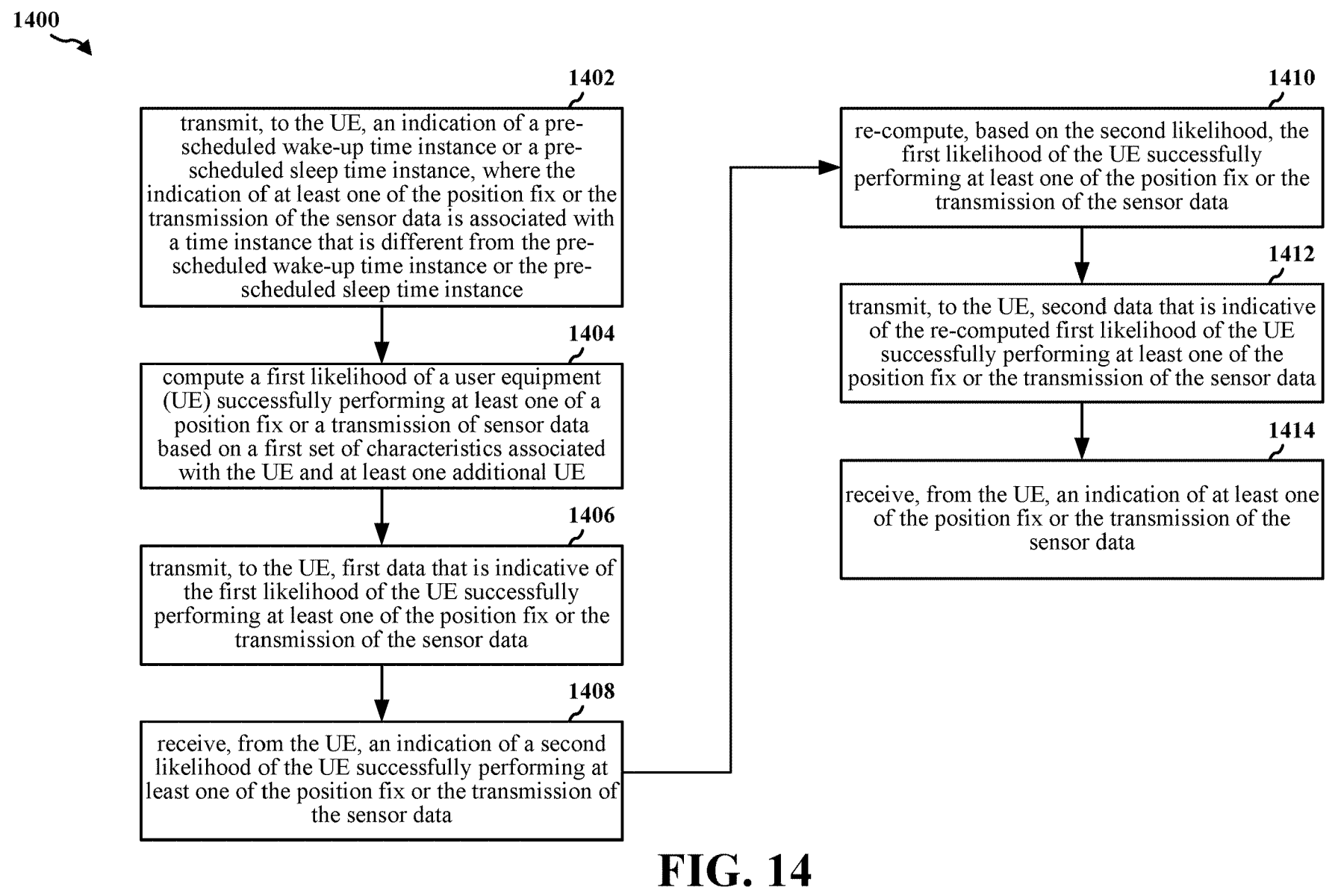

FIG. 14 is a flowchart 1400 of a method of wireless communication. The method may be performed by a server (e.g., the FMS backend 622, the server 1004) or a base station (e.g., the base station 102, the base station 310, the network node 904, the network entity 1502, the network entity 1602). The method may be associated with various advantages at the server, such as facilitating management of IoT devices. In an example, the method (including the various aspects detailed below) may be performed by the asset tracking and monitoring component 199.

At 1404, the server computes a first likelihood of a user equipment (UE) successfully performing at least one of a position fix or a transmission of sensor data based on a first set of characteristics associated with the UE and at least one additional UE. For example, FIG. 10 at 1006 shows that the server 1004 may compute a first likelihood of a UE 1002 successfully performing at least one of a position fix or a transmission of sensor data based on a first set of characteristics associated with the UE 1002 and at least one additional UE. In an example, the first likelihood may be the first likelihood of success 824. In an example, the position fix may be or include the position fix 609 and the sensor data may be or include the sensor data 614. In an example, the first set of characteristics may be or include the fleet characteristics 808. In an example, the UE may be the first IoT device 604 and the at least one additional UE may be the Mth IoT device 606. In an example, 1404 may be performed by the asset tracking and monitoring component 199.

At 1406, the server transmits, to the UE, first data that is indicative of the first likelihood of the UE successfully performing at least one of the position fix or the transmission of the sensor data. For example, FIG. 10 at 1008 shows that the server 1004 may transmit, to the UE 1002, first data that is indicative of the first likelihood of the UE 1002 successfully performing at least one of the position fix or the transmission of the sensor data. In an example, 1406 may be performed by the asset tracking and monitoring component 199.

At 1408, the server receives, from the UE, an indication of a second likelihood of the UE successfully performing at least one of the position fix or the transmission of the sensor data. For example, FIG. 10 at 1012 shows that the server 1004 may receive, from the UE 1002, an indication of a second likelihood of the UE 1002 successfully performing at least one of the position fix or the transmission of the sensor data. In an example, the second likelihood may be or include the second likelihood of success 844. In an example, 1408 may be performed by the asset tracking and monitoring component 199.

In one aspect, at 1410, the server may re-compute, based on the second likelihood, the first likelihood of the UE successfully performing at least one of the position fix or the transmission of the sensor data. For example, FIG. 10 at 1014 shows that the server 1004 may re-compute, based on the second likelihood, the first likelihood of the UE 1002 successfully performing at least one of the position fix or the transmission of the sensor data. In an example, 1410 may be performed by the asset tracking and monitoring component 199.

In one aspect, at 1412, the server may transmit, to the UE, second data that is indicative of the re-computed first likelihood of the UE successfully performing at least one of the position fix or the transmission of the sensor data. For example, FIG. 10 at 1016 shows that the server 1004 may transmit, to the UE 1002, second data that is indicative of the re-computed first likelihood of the UE successfully performing at least one of the position fix or the transmission of the sensor data. In an example, the UE 1002 may use the re-computed first likelihood to re-compute the second likelihood and the UE 1002 may schedule a wake-up time instance or a sleep time instance based on the recomputed second likelihood. In an example, 1412 may be performed by the asset tracking and monitoring component 199.

In one aspect, at 1414, the server may receive, from the UE, an indication of at least one of the position fix or the transmission of the sensor data. For example, FIG. 10 at 1024 shows that the server 1004 may receive, from the UE 1002, an indication of at least one of the position fix or the transmission of the sensor data. In an example, 1414 may be performed by the asset tracking and monitoring component 199.

In one aspect, receiving the indication of at least one of the position fix or the transmission of the sensor data may include receiving, via at least one of a satellite link, a cellular link, or a wireless local area network (WLAN) link, the indication of at least one of the position fix or the transmission of the sensor data. For example, receiving the indication of at least one of the position fix or the transmission of the sensor data at 1024 may include receiving, via at least one of a satellite link, a cellular link, or a wireless local area network (WLAN) link, the indication of at least one of the position fix or the transmission of the sensor data. In an example, the satellite link may be associated with the communication satellite(s) 624, the cellular link may be associated with the network node 628, and the WLAN link may be associated with the WLAN AP 630.

In one aspect, at 1402, the server may transmit, to the UE, an indication of a pre-scheduled wake-up time instance or a pre-scheduled sleep time instance, where the indication of at least one of the position fix or the transmission of the sensor data may be associated with a time instance that is different from the pre-scheduled wake-up time instance or the pre-scheduled sleep time instance. For example, FIG. 10 at 1005 shows that the server 1004 may transmit, to the UE 1002, an indication of a pre-scheduled wake-up time instance or a pre-scheduled sleep time instance, where the indication of at least one of the position fix or the transmission of the sensor data may be associated with a time instance that is different from the pre-scheduled wake-up time instance or the pre-scheduled sleep time instance. In an example, the time instance may correspond to the possible wake-up time instance 856 and the pre-scheduled wake-up time instance or the pre-scheduled sleep time instance may be associated with the pre-scheduled wake-up time instances. In an example, 1402 may be performed by the asset tracking and monitoring component 199.

In one aspect, the UE may include an Internet of things (IoT) device that belongs to a fleet of IoT devices and the server may include a fleet management server. In an example, the IoT device may be or include the first IoT device 604, the fleet of IoT devices may be or include the fleet of IoT devices 604-606, and the fleet management server may be or include the FMS backend 622.

In one aspect, the first set of characteristics may include at least one of a battery life of the UE and the at least one additional UE, a path of the UE and the at least one additional UE, a number of permitted retransmissions associated with the UE and the at least one additional UE, or a signal strength associated with the UE and the at least one additional UE. For example, the aforementioned aspect may correspond to the paths 812, the retries 814, the signal power 816, and/or the device battery 818.

In one aspect, the second likelihood may be based on a second set of characteristics associated with the UE and the second set of characteristics may include at least one of a battery life of the UE, a path of the UE, a number of permitted retransmissions associated with the UE, or a signal strength associated with the UE. For example, the aforementioned aspect may correspond to the paths 836, the retries 838, the signal power 840, and/or the device battery 842.

In one aspect, the sensor data may include at least one of a camera image, a video stream, a temperature measurement, a speed of the UE, or an indication of a battery life of the UE. For example, the sensor data 614 may include at least one of a camera image, a video stream, a temperature measurement, a speed of the UE, or an indication of a battery life of the UE.

In one aspect, computing the first likelihood of the UE successfully performing at least one of the position fix or the transmission of the sensor data may include computing the first likelihood by way of a first machine learning (ML) model of the server and the second likelihood of the UE successfully performing at least one of the position fix or the transmission of the sensor data may be associated with a second ML model of the UE. For example, computing the first likelihood of the UE successfully performing at least one of the position fix or the transmission of the sensor data at 1006 may include computing the first likelihood by way of a first machine learning (ML) model of the server and the second likelihood of the UE successfully performing at least one of the position fix or the transmission of the sensor data may be associated with a second ML model of the UE. In an example, the first ML model of the server may be or include the server ML/AI engine 820 and/or the server ML/AI model 822. In an example, the second ML model of the UE may be or include the IoT device ML/AI engine 828 and/or the IoT device ML/AI model 830.

In one aspect, at least one of the first ML model or the second ML model may be trained based on at least one of spatial factors between the UE and the server or temporal factors between the UE and the server. For example, the spatial factors may be or include the spatial factors 918 and the temporal factors may be or include the temporal factors 920. In an example, the training at least one of the first ML model or the second ML model may be or include the ML/AI training 924.

In one aspect, the spatial factors may include at least one of a distance of the UE to the server or one or more structures that exist between the UE and the server and the temporal factors may include at least one of weather in an environment associated with the UE or temporary interference sources in the environment. For example, the spatial factors 918 may include at least one of a distance of the UE to the server or one or more structures that exist between the UE and the server and the temporal factors 920 may include at least one of weather in an environment associated with the UE or temporary interference sources in the environment.

Figure 15:
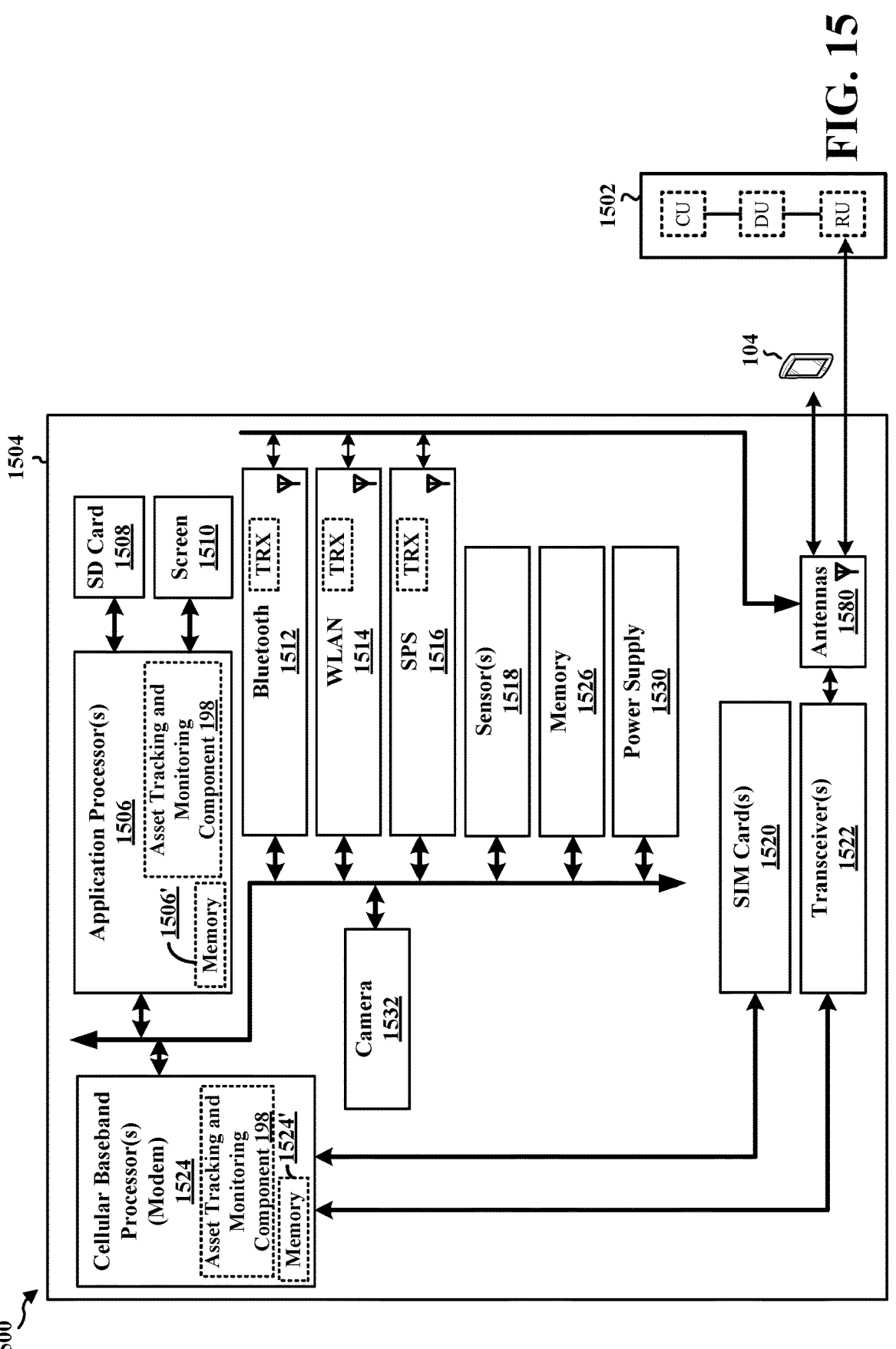
FIG. 15 is a diagram illustrating an example of a hardware implementation for an example apparatus and/or network entity.

FIG. 15 is a diagram 1500 illustrating an example of a hardware implementation for an apparatus 1504. The apparatus 1504 may be a UE, a component of a UE, or may implement UE functionality. In some aspects, the apparatus 1504 may include at least one cellular baseband processor 1524 (also referred to as a modem) coupled to one or more transceivers 1522 (e.g., cellular RF transceiver). The cellular baseband processor(s) 1524 may include at least one on-chip memory 1524'. In some aspects, the apparatus 1504 may further include one or more subscriber identity modules (SIM) cards 1520 and at least one application processor 1506 coupled to a secure digital (SD) card 1508 and a screen 1510. The application processor(s) 1506 may include on-chip memory 1506'. In some aspects, the apparatus 1504 may further include a Bluetooth module 1512, a WLAN module 1514, an SPS module 1516 (e.g., GNSS module), one or more sensor modules 1518 (e.g., barometric pressure sensor/altimeter; motion sensor such as inertial measurement unit (IMU), gyroscope, and/or accelerometer(s); light detection and ranging (LIDAR), radio assisted detection and ranging (RADAR), sound navigation and ranging (SONAR), magnetometer, audio and/or other technologies used for positioning), additional memory modules 1526, a power supply 1530, and/or a camera 1532. The Bluetooth module 1512, the WLAN module 1514, and the SPS module 1516 may include an on-chip transceiver (TRX) (or in some cases, just a receiver (RX)). The Bluetooth module 1512, the WLAN module 1514, and the SPS module 1516 may include their own dedicated antennas and/or utilize the antennas 1580 for communication. The cellular baseband processor(s) 1524 communicates through the transceiver(s) 1522 via one or more antennas 1580 with the UE 104 and/or with an RU associated with a network entity 1502. The cellular baseband processor(s) 1524 and the application processor(s) 1506 may each include a computer-readable medium/memory 1524', 1506', respectively. The additional memory modules 1526 may also be considered a computer-readable medium/memory. Each computer-readable medium/memory 1524', 1506', 1526 may be non-transitory. The cellular baseband processor(s) 1524 and the application processor(s) 1506 are each responsible for general processing, including the execution of software stored on the computer-readable medium/memory. The software, when executed by the cellular baseband processor(s) 1524/application processor(s) 1506, causes the cellular baseband processor(s) 1524/application processor(s) 1506 to perform the various functions described supra. The computer-readable medium/memory may also be used for storing data that is manipulated by the cellular baseband processor(s) 1524/application processor(s) 1506 when executing software. The cellular baseband processor(s) 1524/application processor(s) 1506 may be a component of the UE 350 and may include the at least one memory 360 and/or at least one of the TX processor 368, the RX processor 356, and the controller/processor 359. In one configuration, the apparatus 1504 may be at least one processor chip (modem and/or application) and include just the cellular baseband processor(s) 1524 and/or the application processor(s) 1506, and in another configuration, the apparatus 1504 may be the entire UE (e.g., see UE 350 of FIG. 3) and include the additional modules of the apparatus 1504.

As discussed supra, the asset tracking and monitoring component 198 may be configured to receive, from a server, first data that is indicative of a first likelihood of the UE successfully performing at least one of a position fix or a transmission of sensor data based on a first set of characteristics associated with the UE and at least one additional UE. The asset tracking and monitoring component 198 may be configured to compute, based on the first data and a second set of characteristics associated with the UE, a second likelihood of the UE successfully performing at least one of the position fix or the transmission of the sensor data. The asset tracking and monitoring component 198 may be configured to schedule, based on the second likelihood, a wake-up time instance or a sleep time instance. The asset tracking and monitoring component 198 may be configured to transition the UE (1) from a sleep state to an active state at the wake-up time instance or (2) from the active state to the sleep state at the sleep time instance. The asset tracking and monitoring component 198 may be configured to transmit, to the server, an indication of the second likelihood of the UE successfully performing at least one of the position fix or the transmission of the sensor data. The asset tracking and monitoring component 198 may be configured to receive, from the server based on the second likelihood, second data that is indicative of a re-computed first likelihood of the UE successfully performing at least one of the position fix or the transmission of the sensor data. The asset tracking and monitoring component 198 may be configured to perform, based on the second likelihood, at least one of the position fix or the transmission of the sensor data at or after the wake-up time instance. The asset tracking and monitoring component 198 may be configured to receive, from the server, an indication of a pre-scheduled wake-up time instance or a pre-scheduled sleep time instance, where the wake-up time instance or the sleep time instance differ from the pre-scheduled wake-up time instance or the pre-scheduled sleep time instance, respectively. The asset tracking and monitoring component 198 may be within the cellular baseband processor(s) 1524, the application processor(s) 1506, or both the cellular baseband processor(s) 1524 and the application processor(s) 1506. The asset tracking and monitoring component 198 may be one or more hardware components specifically configured to carry out the stated processes/algorithm, implemented by one or more processors configured to perform the stated processes/algorithm, stored within a computer-readable medium for implementation by one or more processors, or some combination thereof. When multiple processors are implemented, the multiple processors may perform the stated processes/algorithm individually or in combination. As shown, the apparatus 1504 may include a variety of components configured for various functions. In one configuration, the apparatus 1504, and in particular the cellular baseband processor(s) 1524 and/or the application processor(s) 1506, may include means for receiving, from a server, first data that is indicative of a first likelihood of the UE successfully performing at least one of a position fix or a transmission of sensor data based on a first set of characteristics associated with the UE and at least one additional UE In one configuration, the apparatus 1504, and in particular the cellular baseband processor(s) 1524 and/or the application processor(s) 1506, may include means for computing, based on the first data and a second set of characteristics associated with the UE, a second likelihood of the UE successfully performing at least one of the position fix or the transmission of the sensor data. In one configuration, the apparatus 1504, and in particular the cellular baseband processor(s) 1524 and/or the application processor(s) 1506, may include means for scheduling, based on the second likelihood, a wake-up time instance or a sleep time instance. In one configuration, the apparatus 1504, and in particular the cellular baseband processor(s) 1524 and/or the application processor(s) 1506, may include means for transitioning the UE (1) from a sleep state to an active state at the wake-up time instance or (2) from the active state to the sleep state at the sleep time instance. In one configuration, the apparatus 1504, and in particular the cellular baseband processor(s) 1524 and/or the application processor(s) 1506, may include means for transmitting, to the server, an indication of the second likelihood of the UE successfully performing at least one of the position fix or the transmission of the sensor data. In one configuration, the apparatus 1504, and in particular the cellular baseband processor(s) 1524 and/or the application processor(s) 1506, may include means for receiving, from the server based on the second likelihood, second data that is indicative of a re-computed first likelihood of the UE successfully performing at least one of the position fix or the transmission of the sensor data. In one configuration, the apparatus 1504, and in particular the cellular baseband processor(s) 1524 and/or the application processor(s) 1506, may include means for performing, based on the second likelihood, at least one of the position fix or the transmission of the sensor data at or after the wake-up time instance. In one configuration, the apparatus 1504, and in particular the cellular baseband processor(s) 1524 and/or the application processor(s) 1506, may include means for receiving, from the server, an indication of a pre-scheduled wake-up time instance or a pre-scheduled sleep time instance, where the wake-up time instance or the sleep time instance differ from the pre-scheduled wake-up time instance or the pre-scheduled sleep time instance, respectively. The means may be the asset tracking and monitoring component 198 of the apparatus 1504 configured to perform the functions recited by the means. As described supra, the apparatus 1504 may include the TX processor 368, the RX processor 356, and the controller/processor 359. As such, in one configuration, the means may be the TX processor 368, the RX processor 356, and/or the controller/processor 359 configured to perform the functions recited by the means.

Figure 16:
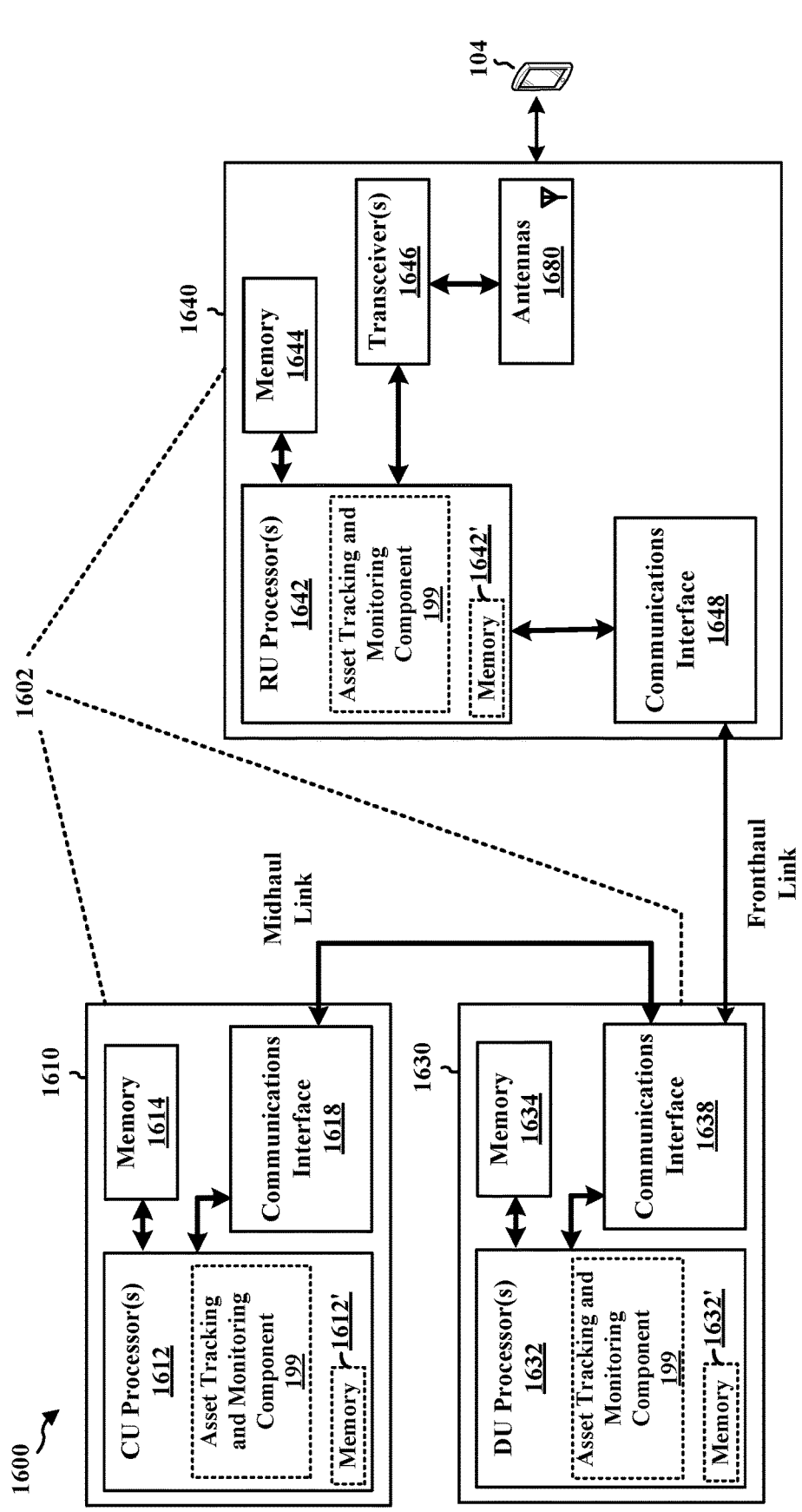
FIG. 16 is a diagram illustrating an example of a hardware implementation for an example network entity.

FIG. 16 is a diagram 1600 illustrating an example of a hardware implementation for a network entity 1602. The network entity 1602 may be a BS, a component of a BS, or may implement BS functionality. The network entity 1602 may include at least one of a CU 1610, a DU 1630, or an RU 1640. For example, depending on the layer functionality handled by the asset tracking and monitoring component

199, the network entity 1602 may include the CU 1610; both the CU 1610 and the DU 1630; each of the CU 1610, the DU 1630, and the RU 1640; the DU 1630; both the DU 1630 and the RU 1640; or the RU 1640. The CU 1610 may include at least one CU processor 1612. The CU processor(s) 1612 may include on-chip memory 1612'. In some aspects, the CU 1610 may further include additional memory modules 1614 and a communications interface 1618. The CU 1610 communicates with the DU 1630 through a midhaul link, such as an F1 interface. The DU 1630 may include at least one DU processor 1632. The DU processor(s) 1632 may include on-chip memory 1632'. In some aspects, the DU 1630 may further include additional memory modules 1634 and a communications interface 1638. The DU 1630 communicates with the RU 1640 through a fronthaul link. The RU 1640 may include at least one RU processor 1642. The RU processor(s) 1642 may include on-chip memory 1642'. In some aspects, the RU 1640 may further include additional memory modules 1644, one or more transceivers 1646, antennas 1680, and a communications interface 1648. The RU 1640 communicates with the UE 104. The on-chip memory 1612', 1632', 1642' and the additional memory modules 1614, 1634, 1644 may each be considered a computer-readable medium/memory. Each computer-readable medium/memory may be non-transitory. Each of the processors 1612, 1632, 1642 is responsible for general processing, including the execution of software stored on the computer-readable medium/memory. The software, when executed by the corresponding processor(s) causes the processor(s) to perform the various functions described supra. The computer-readable medium/memory may also be used for storing data that is manipulated by the processor(s) when executing software.

As discussed supra, the asset tracking and monitoring component 199 may be configured to compute a first likelihood of a user equipment (UE) successfully performing at least one of a position fix or a transmission of sensor data based on a first set of characteristics associated with the UE and at least one additional UE. The asset tracking and monitoring component 199 may be configured to transmit, to the UE, first data that is indicative of the first likelihood of the UE successfully performing at least one of the position fix or the transmission of the sensor data. The asset tracking and monitoring component 199 may be configured to receive, from the UE, an indication of a second likelihood of the UE successfully performing at least one of the position fix or the transmission of the sensor data. The asset tracking and monitoring component 199 may be configured to re-compute, based on the second likelihood, the first likelihood of the UE successfully performing at least one of the position fix or the transmission of the sensor data. The asset tracking and monitoring component 199 may be configured to transmit, to the UE, second data that is indicative of the re-computed first likelihood of the UE successfully performing at least one of the position fix or the transmission of the sensor data. The asset tracking and monitoring component 199 may be configured to receive, from the UE, an indication of at least one of the position fix or the transmission of the sensor data. The asset tracking and monitoring component 199 may be configured to transmit, to the UE, an indication of a pre-scheduled wake-up time instance or a pre-scheduled sleep time instance, where the indication of at least one of the position fix or the transmission of the sensor data is associated with a time instance that is different from the pre-scheduled wake-up time instance or the pre-scheduled sleep time instance. The asset tracking and monitoring component 199 may be within one or more processors of one or more of the CU 1610, DU 1630, and the RU 1640. The asset tracking and monitoring component 199 may be one or more hardware components specifically configured to carry out the stated processes/algorithm, implemented by one or more processors configured to perform the stated processes/ algorithm, stored within a computer-readable medium for implementation by one or more processors, or some combination thereof. When multiple processors are implemented, the multiple processors may perform the stated processes/algorithm individually or in combination. The network entity 1602 may include a variety of components configured for various functions. In one configuration, the network entity 1602 may include means for computing a first likelihood of a user equipment (UE) successfully performing at least one of a position fix or a transmission of sensor data based on a first set of characteristics associated with the UE and at least one additional UE. In one configuration, the network entity 1602 may include means for transmitting, to the UE, first data that is indicative of the first likelihood of the UE successfully performing at least one of the position fix or the transmission of the sensor data. In one configuration, the network entity 1602 may include means for receiving, from the UE, an indication of a second likelihood of the UE successfully performing at least one of the position fix or the transmission of the sensor data. In one configuration, the network entity 1602 may include means for re-computing, based on the second likelihood, the first likelihood of the UE successfully performing at least one of the position fix or the transmission of the sensor data. In one configuration, the network entity 1602 may include means for transmitting, to the UE, second data that is indicative of the re-computed first likelihood of the UE successfully performing at least one of the position fix or the transmission of the sensor data. In one configuration, the network entity 1602 may include means for receiving, from the UE, an indication of at least one of the position fix or the transmission of the sensor data. In one configuration, the network entity 1602 may include means for transmitting, to the UE, an indication of a pre-scheduled wake-up time instance or a pre-scheduled sleep time instance, where the indication of at least one of the position fix or the transmission of the sensor data is associated with a time instance that is different from the pre-scheduled wake-up time instance or the pre-scheduled sleep time instance. The means may be the asset tracking and monitoring component 199 of the network entity 1602 configured to perform the functions recited by the means. As described supra, the network entity 1602 may include the TX processor 316, the RX processor 370, and the controller/processor 375. As such, in one configuration, the means may be the TX processor 316, the RX processor 370, and/or the controller/processor 375 configured to perform the functions recited by the means.

An Internet of Things (IoT) device may refer to a device that includes sensors, processor(s), software, and other technologies that connect and exchange data with other devices (e.g., other IoT devices, a server, etc.) and systems over a network (e.g., the Internet). IoT devices may be part of a fleet of IoT devices managed by a fleet management system (FMS) backend (e.g., a server, a cloud server, etc.). In an example, the fleet of IoT devices may be included in/implemented on vehicles that travel over a geographic area. The IoT devices may be configured to wake up at predefined intervals in order to perform a position fix (e.g., determine a location of an IoT device by way of a global navigation satellite system (GNSS)) and/or to collect sensor data (e.g., perform temperature measurements, capture images, etc.). The IoT devices may then transmit an indication of the position fix and/or the sensor data to the FMS backend, where the FMS backend may utilize the position fix and/or the sensor data to manage the IoT devices and/or to perform other functionality.

In some scenarios, an IoT device may be (1) unable to perform the position fix, (2) unable to collect the sensor data, and/or (3) unable to transmit the indication of the position fix or the sensor data. For instance, conditions in an environment of the IoT device may prevent the IoT device from being able to perform the position fix, sensors of the IoT device may be damaged, and/or interference may exist in a communication channel used by the IoT device to transmit the indication of the position fix and/or the sensor data to the FMS backend. The IoT device may wakeup and attempt to perform the position fix and/or collect the sensor data at the predefined intervals regardless of whether the IoT device will be able to successfully perform the position fix and/or collect the sensor data and regardless of whether the IoT device will be able to successfully transmit the indication of the position fix and/or the sensor data to the FMS backend. As the IoT device may have a limited battery life, waking up and unsuccessfully transmitting the indication of the position fix and/or the sensor data to the FMS backend may rapidly drain a battery of the IoT device (e.g., due to processor clock cycles used in repeated failed transmissions and/or due to power used by an antenna of the IoT device in the attempted transmissions), which may impede fleet management by the FMS backend.

Various technologies pertaining to opportunistic position location determination and reporting for asset tracking and monitoring are described herein. In an example, an apparatus (e.g., a UE) receives, from a server, first data that is indicative of a first likelihood of the UE successfully performing at least one of a position fix or a transmission of sensor data based on a first set of characteristics associated with the UE and at least one additional UE. The apparatus (e.g., a UE) computes, based on the first data and a second set of characteristics associated with the UE, a second likelihood of the UE successfully performing at least one of the position fix or the transmission of the sensor data. The apparatus (e.g., a UE) schedules, based on the second likelihood, a wake-up time instance or a sleep time instance. The apparatus (e.g., a UE) transitions the UE (1) from a sleep state to an active state at the wake-up time instance or (2) from the active state to the sleep state at the sleep time instance. Vis-à-vis computing the second likelihood based on the first likelihood and the second set of characteristics and scheduling the wake-up time instance or the sleep time instance based on the second likelihood, a UE may conserve battery power by opportunistically waking up at a time when performance of the position fix and/or transmission of the sensor data is likely to be successful, as opposed to blindly waking up at a predetermined wake-up time instance where the UE has no knowledge of whether performance of the position fix and/or transmission of the sensor data will be successful. Furthermore, vis-à-vis computing the second likelihood based on the first likelihood and the second set of characteristics and scheduling the wake-up time instance or the sleep time instance based on the second likelihood, the UE may conserve processing power and/or network resources by avoiding performing position fixes and/or transmitting sensor data in situations where position fixes and/or transmitting sensor data are unlikely to be successful.

In another example, an apparatus (e.g., a server) computes a first likelihood of a user equipment (UE) successfully performing at least one of a position fix or a transmission of sensor data based on a first set of characteristics associated with the UE and at least one additional UE. The apparatus (e.g., a server) transmits, to the UE, first data that is indicative of the first likelihood of the UE successfully performing at least one of the position fix or the transmission of the sensor data. The apparatus receives, from the UE, an indication of a second likelihood of the UE successfully performing at least one of the position fix or the transmission of the sensor data. Vis-à-vis transmitting the first data that is indicative of the first likelihood of the UE successfully performing at least one of the position fix or the transmission of the sensor data to the UE and receiving, from the UE, an indication of a second likelihood of the UE successfully performing at least one of the position fix or the transmission of the sensor data, the server may facilitate asset tracking and management of UEs.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not limited to the aspects described herein, but are to be accorded the full scope consistent with the language claims. Reference to an element in the singular does not mean "one and only one" unless specifically so stated, but rather "one or more." Terms such as "if," "when," and "while" do not imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. Sets should be interpreted as a set of elements where the elements number one or more. Accordingly, for a set of X, X would include one or more elements. When at least one processor is configured to perform a set of functions, the at least one processor, individually or in any combination, is configured to perform the set of functions. Accordingly, each processor of the at least one processor may be configured to perform a particular subset of the set of functions, where the subset is the full set, a proper subset of the set, or an empty subset of the set. A processor may be referred to as processor circuitry. A memory/memory module may be referred to as memory circuitry. If a first apparatus receives data from or transmits data to a second apparatus, the data may be received/transmitted directly between the first and second apparatuses, or indirectly between the first and second apparatuses through a set of apparatuses. A device configured to "output" data, such as a transmission, signal, or message, may transmit the data, for example with a transceiver, or may send the data to a device that transmits the data. A device configured to "obtain" data, such as a transmission, signal, or message, may receive, for example with a transceiver, or may obtain the data from a device that receives the data. Information stored in a memory includes instructions and/or data. All structural and functional equivalents to the elements of the various aspects described throughout this disclosure that are known or later come to be known to those of ordinary skill in the art are expressly incorporated herein by reference and are encompassed by the claims. Moreover, nothing disclosed herein is dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

As used herein, the phrase "based on" shall not be construed as a reference to a closed set of information, one or more conditions, one or more factors, or the like. In other words, the phrase "based on A" (where "A" may be information, a condition, a factor, or the like) shall be construed as "based at least on A" unless specifically recited differently.

The following aspects are illustrative only and may be combined with other aspects or teachings described herein, without limitation.

Aspect 1 is a method of wireless communication at a user equipment (UE), including: receiving, from a server, first data that is indicative of a first likelihood of the UE successfully performing at least one of a position fix or a transmission of sensor data based on a first set of characteristics associated with the UE and at least one additional UE; computing, based on the first data and a second set of characteristics associated with the UE, a second likelihood of the UE successfully performing at least one of the position fix or the transmission of the sensor data; scheduling, based on the second likelihood, a wake-up time instance or a sleep time instance; and transitioning the UE (1) from a sleep state to an active state at the wake-up time instance or (2) from the active state to the sleep state at the sleep time instance.

Aspect 2 is the method of aspect 1, further including: transmitting, to the server, an indication of the second likelihood of the UE successfully performing at least one of the position fix or the transmission of the sensor data.

Aspect 3 is the method of aspect 2, further including: receiving, from the server based on the second likelihood, second data that is indicative of a re-computed first likelihood of the UE successfully performing at least one of the position fix or the transmission of the sensor data.

Aspect 4 is the method of any of aspects 1-3, further including: performing, based on the second likelihood, at least one of the position fix or the transmission of the sensor data at or after the wake-up time instance.

Aspect 5 is the method of aspect 4, wherein performing at least one of the position fix or the transmission of the sensor data includes transmitting, to the server via a least one of a satellite link, a cellular link, or a wireless local area network (WLAN) link, an indication of at least one of the position fix or the sensor data.

Aspect 6 is the method of any of aspects 1-5, further including: receiving, from the server, an indication of a pre-scheduled wake-up time instance or a pre-scheduled sleep time instance, wherein the wake-up time instance or the sleep time instance differ from the pre-scheduled wake-up time instance or the pre-scheduled sleep time instance, respectively.

Aspect 7 is the method of any of aspects 1-6, wherein the UE includes an Internet of things (IoT) device that belongs to a fleet of IoT devices, and wherein the server includes a fleet management server.

Aspect 8 is the method of any of aspects 1-7, wherein the first set of characteristics includes at least one of a battery life of the UE and the at least one additional UE, a path of the UE and the at least one additional UE, a number of permitted retransmissions associated with the UE and the at least one additional UE, or a signal strength associated with the UE and the at least one additional UE.

Aspect 9 is the method of any of aspects 1-8, wherein the second set of characteristics includes at least one of a battery life of the UE, a path of the UE, a number of permitted retransmissions associated with the UE, or a signal strength associated with the UE.

Aspect 10 is the method of any of aspects 1-9, wherein the sensor data includes at least one of a camera image, a video stream, a temperature measurement, a speed of the UE, or an indication of a battery life of the UE.

Aspect 11 is the method of any of aspects 1-10, wherein the first data is associated with a first machine learning (ML) model of the server, and wherein computing the second likelihood of the UE successfully performing at least one of the position fix or the transmission of the sensor data includes computing the second likelihood by way of a second ML model of the UE.

Aspect 12 is the method of aspect 11, wherein at least one of the first ML model or the second ML model is trained based on at least one of spatial factors between the UE and the server or temporal factors between the UE and the server.

Aspect 13 is the method of aspect 12, wherein the spatial factors include at least one of a distance of the UE to the server or one or more structures that exist between the UE and the server, and wherein the temporal factors include at least one of weather in an environment associated with the UE or temporary interference sources in the environment.

Aspect 14 is an apparatus for wireless communication at a user equipment (UE) comprising at least one memory and at least one processor coupled to the at least one memory and, based at least in part on information stored in the at least one memory, the at least one processor, individually or in any combination, is configured to implement a method as in any of aspects 1-13.

Aspect 15 is the apparatus of aspect 14, further comprising at least one of a transceiver or an antenna coupled to the at least one processor, wherein to receive the first data, the at least one processor, individually or in any combination, is configured to receive the first data via at least one of the transceiver or the antenna.

Aspect 16 is an apparatus for wireless communication, further comprising means for performing a method as in any of aspects 1-13.

Aspect 17 is a computer-readable medium (e.g., a non-transitory computer-readable medium) storing computer executable code, the computer executable code, when executed by at least one processor, causes the at least one processor to implement a method as in any of aspects 1-13.

Aspect 18 is a method of wireless communication at a server, including: computing a first likelihood of a user equipment (UE) successfully performing at least one of a position fix or a transmission of sensor data based on a first set of characteristics associated with the UE and at least one additional UE; transmitting, to the UE, first data that is indicative of the first likelihood of the UE successfully performing at least one of the position fix or the transmission of the sensor data; and receiving, from the UE, an indication of a second likelihood of the UE successfully performing at least one of the position fix or the transmission of the sensor data.

Aspect 19 is the method of aspect 18, further including: re-computing, based on the second likelihood, the first likelihood of the UE successfully performing at least one of the position fix or the transmission of the sensor data.

Aspect 20 is the method of aspect 19, further including: transmitting, to the UE, second data that is indicative of the re-computed first likelihood of the UE successfully performing at least one of the position fix or the transmission of the sensor data.

Aspect 21 is the method of any of aspects 18-20, further including: receiving, from the UE, an indication of at least one of the position fix or the transmission of the sensor data.

Aspect 22 is the method of aspect 21, wherein receiving the indication of at least one of the position fix or the transmission of the sensor data includes receiving, via at least one of a satellite link, a cellular link, or a wireless local area network (WLAN) link, the indication of at least one of the position fix or the transmission of the sensor data.

Aspect 23 is the method of any of aspects 21-22, further including: transmitting, to the UE, an indication of a pre-scheduled wake-up time instance or a pre-scheduled sleep time instance, wherein the indication of at least one of the position fix or the transmission of the sensor data is associated with a time instance that is different from the pre-scheduled wake-up time instance or the pre-scheduled sleep time instance.

Aspect 24 is the method of any of aspects 18-23, wherein the UE includes an Internet of things (IoT) device that belongs to a fleet of IoT devices, and wherein the server includes a fleet management server.

Aspect 25 is the method of any of aspects 18-24, wherein the first set of characteristics includes at least one of a battery life of the UE and the at least one additional UE, a path of the UE and the at least one additional UE, a number of permitted retransmissions associated with the UE and the at least one additional UE, or a signal strength associated with the UE and the at least one additional UE.

Aspect 26 is the method of any of aspects 18-25, wherein the second likelihood is based on a second set of characteristics associated with the UE, and wherein the second set of characteristics includes at least one of a battery life of the UE, a path of the UE, a number of permitted retransmissions associated with the UE, or a signal strength associated with the UE.

Aspect 27 is the method of any of aspects 18-26, wherein the sensor data includes at least one of a camera image, a video stream, a temperature measurement, a speed of the UE, or an indication of a battery life of the UE.

Aspect 28 is the method of any of aspects 18-27, wherein computing the first likelihood of the UE successfully performing at least one of the position fix or the transmission of the sensor data includes computing the first likelihood by way of a first machine learning (ML) model of the server, and wherein the second likelihood of the UE successfully performing at least one of the position fix or the transmission of the sensor data is associated with a second ML model of the UE.

Aspect 29 is the method of aspect 28, wherein at least one of the first ML model or the second ML model is trained based on at least one of spatial factors between the UE and the server or temporal factors between the UE and the server.

Aspect 30 is the method of aspect 29, wherein the spatial factors include at least one of a distance of the UE to the server or one or more structures that exist between the UE and the server, and wherein the temporal factors include at least one of weather in an environment associated with the UE or temporary interference sources in the environment.

Aspect 31 is an apparatus for wireless communication at server comprising at least one memory and at least one processor coupled to the at least one memory and, based at least in part on information stored in the at least one memory, the at least one processor, individually or in any combination, is configured to implement a method as in any of aspects 18-30.

Aspect 32 is the apparatus of aspect 31, further comprising at least one of a transceiver or an antenna coupled to the at least one processor, wherein to transmit the first data, the at least one processor, individually or in any combination, is configured to transmit the first data via at least one of the transceiver or the antenna.

Aspect 33 is an apparatus for wireless communication, further comprising means for performing a method as in any of aspects 18-30.

Aspect 34 is a computer-readable medium (e.g., a non-transitory computer-readable medium) storing computer executable code, the computer executable code, when executed by at least one processor, causes the at least one processor to implement a method as in any of aspects 18-30.

What is claimed is:

1. An apparatus for wireless communication at a user equipment (UE), comprising:
at least one memory; and
at least one processor coupled to the at least one memory and, based at least in part on information stored in the at least one memory, the at least one processor, individually or in any combination, is configured to:
receive, from a server, first data that is indicative of a first likelihood of the UE successfully performing at least one of a position fix or a transmission of sensor data based on a first set of characteristics associated with the UE and at least one additional UE;
compute, based on the first data and a second set of characteristics associated with the UE, a second likelihood of the UE successfully performing at least one of the position fix or the transmission of the sensor data;
schedule, based on the second likelihood, a wake-up time instance or a sleep time instance; and
transition the UE (1) from a sleep state to an active state at the wake-up time instance or (2) from the active state to the sleep state at the sleep time instance.

2. The apparatus of claim 1, wherein the at least one processor, individually or in any combination, is further configured to:
transmit, to the server, an indication of the second likelihood of the UE successfully performing at least one of the position fix or the transmission of the sensor data.

3. The apparatus of claim 2, wherein the at least one processor, individually or in any combination, is further configured to:

receive, from the server based on the second likelihood, second data that is indicative of a re-computed first likelihood of the UE successfully performing at least one of the position fix or the transmission of the sensor data.

4. The apparatus of claim 1, wherein the at least one processor, individually or in any combination, is further configured to:
perform, based on the second likelihood, at least one of the position fix or the transmission of the sensor data at or after the wake-up time instance.

5. The apparatus of claim 4, wherein to perform at least one of the position fix or the transmission of the sensor data, the at least one processor, individually or in any combination, is configured to transmit, to the server via a least one of a satellite link, a cellular link, or a wireless local area network (WLAN) link, an indication of at least one of the position fix or the sensor data.

6. The apparatus of claim 1, wherein the at least one processor, individually or in any combination, is further configured to:
receive, from the server, an indication of a pre-scheduled wake-up time instance or a pre-scheduled sleep time instance, wherein the wake-up time instance or the sleep time instance differ from the pre-scheduled wake-up time instance or the pre-scheduled sleep time instance, respectively.

7. The apparatus of claim 1, wherein the UE comprises an Internet of things (IoT) device that belongs to a fleet of IoT devices, and wherein the server comprises a fleet management server.

8. The apparatus of claim 1, wherein the first set of characteristics comprises at least one of a battery life of the UE and the at least one additional UE, a path of the UE and the at least one additional UE, a number of permitted retransmissions associated with the UE and the at least one additional UE, or a signal strength associated with the UE and the at least one additional UE.

9. The apparatus of claim 1, wherein the second set of characteristics comprises at least one of a battery life of the UE, a path of the UE, a number of permitted retransmissions associated with the UE, or a signal strength associated with the UE.

10. The apparatus of claim 1, wherein the sensor data comprises at least one of a camera image, a video stream, a temperature measurement, a speed of the UE, or an indication of a battery life of the UE.

11. The apparatus of claim 1, wherein the first data is associated with a first machine learning (ML) model of the server, and wherein to compute the second likelihood of the UE successfully performing at least one of the position fix or the transmission of the sensor data, the at least one processor, individually or in any combination, is configured to compute the second likelihood by way of a second ML model of the UE.

12. The apparatus of claim 11, wherein at least one of the first ML model or the second ML model is trained based on at least one of spatial factors between the UE and the server or temporal factors between the UE and the server.

13. The apparatus of claim 12, wherein the spatial factors comprise at least one of a distance of the UE to the server or one or more structures that exist between the UE and the server, and wherein the temporal factors comprise at least one of weather in an environment associated with the UE or temporary interference sources in the environment.

14. The apparatus of claim 1, further comprising at least one of a transceiver or an antenna coupled to the at least one processor, wherein to receive the first data, the at least one processor, individually or in any combination, is configured to receive the first data via at least one of the transceiver or the antenna.

15. An apparatus for wireless communication at a server, comprising:

at least one memory; and at least one processor coupled to the at least one memory and, based at least in part on information stored in the at least one memory, the at least one processor, individually or in any combination, is configured to:

compute a first likelihood of a user equipment (UE) successfully performing at least one of a position fix or a transmission of sensor data based on a first set of characteristics associated with the UE and at least one additional UE;

transmit, to the UE, first data that is indicative of the first likelihood of the UE successfully performing at least one of the position fix or the transmission of the sensor data; and receive, from the UE, an indication of a second likelihood of the UE successfully performing at least one of the position fix or the transmission of the sensor data.

16. The apparatus of claim 15, wherein the at least one processor, individually or in any combination, is further configured to:

re-compute, based on the second likelihood, the first likelihood of the UE successfully performing at least one of the position fix or the transmission of the sensor data.

17. The apparatus of claim 16, wherein the at least one processor, individually or in any combination, is further configured to:

transmit, to the UE, second data that is indicative of the re-computed first likelihood of the UE successfully performing at least one of the position fix or the transmission of the sensor data.

18. The apparatus of claim 15, wherein the at least one processor, individually or in any combination, is further configured to:

receive, from the UE, an indication of at least one of the position fix or the transmission of the sensor data.

19. The apparatus of claim 18, wherein to receive the indication of at least one of the position fix or the transmission of the sensor data, the at least one processor, individually or in any combination, is configured to receive, via at least one of a satellite link, a cellular link, or a wireless local area network (WLAN) link, the indication of at least one of the position fix or the transmission of the sensor data.

20. The apparatus of claim 18, wherein the at least one processor, individually or in any combination, is further configured to:

transmit, to the UE, an indication of a pre-scheduled wake-up time instance or a pre-scheduled sleep time instance, wherein the indication of at least one of the position fix or the transmission of the sensor data is associated with a time instance that is different from the pre-scheduled wake-up time instance or the pre-scheduled sleep time instance.

21. The apparatus of claim 15, wherein the UE comprises an Internet of things (IoT) device that belongs to a fleet of IoT devices, and wherein the server comprises a fleet management server.

22. The apparatus of claim 15, wherein the first set of characteristics comprises at least one of a battery life of the UE and the at least one additional UE, a path of the UE and the at least one additional UE, a number of permitted retransmissions associated with the UE and the at least one additional UE, or a signal strength associated with the UE and the at least one additional UE.

23. The apparatus of claim 15, wherein the second likelihood is based on a second set of characteristics associated with the UE, and wherein the second set of characteristics comprises at least one of a battery life of the UE, a path of the UE, a number of permitted retransmissions associated with the UE, or a signal strength associated with the UE.

24. The apparatus of claim 15, wherein the sensor data comprises at least one of a camera image, a video stream, a temperature measurement, a speed of the UE, or an indication of a battery life of the UE.

25. The apparatus of claim 15, wherein to compute the first likelihood of the UE successfully performing at least one of the position fix or the transmission of the sensor data, the at least one processor, individually or in any combination, is configured to compute the first likelihood by way of a first machine learning (ML) model of the server, and wherein the second likelihood of the UE successfully performing at least one of the position fix or the transmission of the sensor data is associated with a second ML model of the UE.

26. The apparatus of claim 25, wherein at least one of the first ML model or the second ML model is trained based on at least one of spatial factors between the UE and the server or temporal factors between the UE and the server.

27. The apparatus of claim 26, wherein the spatial factors comprise at least one of a distance of the UE to the server or one or more structures that exist between the UE and the server, and wherein the temporal factors comprise at least one of weather in an environment associated with the UE or temporary interference sources in the environment.

28. The apparatus of claim 15, further comprising at least one of a transceiver or an antenna coupled to the at least one processor, wherein to transmit the first data, the at least one processor, individually or in any combination, is configured to transmit the first data via at least one of the transceiver or the antenna.

29. A method of wireless communication at a user equipment (UE), comprising:

receiving, from a server, first data that is indicative of a first likelihood of the UE successfully performing at least one of a position fix or a transmission of sensor data based on a first set of characteristics associated with the UE and at least one additional UE;

computing, based on the first data and a second set of characteristics associated with the UE, a second likelihood of the UE successfully performing at least one of the position fix or the transmission of the sensor data;

scheduling, based on the second likelihood, a wake-up time instance or a sleep time instance; and transitioning the UE (1) from a sleep state to an active state at the wake-up time instance or (2) from the active state to the sleep state at the sleep time instance.

30. A method of wireless communication at a server, comprising:

computing a first likelihood of a user equipment (UE) successfully performing at least one of a position fix or a transmission of sensor data based on a first set of characteristics associated with the UE and at least one additional UE;

transmitting, to the UE, first data that is indicative of the first likelihood of the UE successfully performing at least one of the position fix or the transmission of the sensor data; and receiving, from the UE, an indication of a second likelihood of the UE successfully performing at least one of the position fix or the transmission of the sensor data.

* * * * *